(12) United States Patent
Zou et al.

(10) Patent No.: US 11,940,717 B1
(45) Date of Patent: Mar. 26, 2024

(54) PHOTOGRAPHY STAND

(71) Applicant: Shenzhen Weiji Technology Co., Ltd., Shenzhen (CN)

(72) Inventors: Qingqing Zou, Shenzhen (CN); Ruoyu Pan, Shenzhen (CN); Jianxiong Xia, Shenzhen (CN); Shuai Qin, Shenzhen (CN); Xinzhi Wang, Shenzhen (CN)

(73) Assignee: Shenzhen Weijl Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/113,105

(22) Filed: Feb. 23, 2023

(30) Foreign Application Priority Data

Sep. 5, 2022 (CN) .......................... 202211078117.2
Sep. 5, 2022 (CN) .......................... 202222392036.1
Nov. 2, 2022 (CN) .......................... 202222914910.3
Nov. 2, 2022 (CN) .......................... 202222914925.X
Nov. 2, 2022 (CN) .......................... 202222919354.9

(51) Int. Cl.
*G03B 17/56* (2021.01)
*F16M 11/28* (2006.01)
*F16M 11/38* (2006.01)

(52) U.S. Cl.
CPC .......... *G03B 17/561* (2013.01); *F16M 11/28* (2013.01); *F16M 11/38* (2013.01); *F16M 2200/028* (2013.01)

(58) Field of Classification Search
CPC ....... G03B 17/561; F16M 11/28; F16M 11/38
See application file for complete search history.

(56) References Cited

U.S. PATENT DOCUMENTS 7,111,424 B1 * 9/2006 Moody ................... F41A 23/10
42/72

FOREIGN PATENT DOCUMENTS

| CN | 112594516 A | * | 4/2021 | ........... F16M 11/041 |
| CN | 112594516 A | | 4/2021 | |
| CN | 213347582 U | * | 6/2021 | |

* cited by examiner

*Primary Examiner* — Minh Q Phan
(74) *Attorney, Agent, or Firm* — Bayramoglu Law Offices L.L.C

(57) ABSTRACT

A photography stand includes a central pipe and a supporting frame. The top of the central pipe is configured to mount photographic equipment. The supporting frame is connected to the central pipe, and provided adjacent to the bottom of the central pipe. The supporting frame moves relative to the central pipe along the axial direction of the central pipe. The supporting frame is unfolded when moving along the axial direction of the central pipe toward the bottom of the central pipe by a preset distance and then moving continuously toward the bottom of the central pipe. The supporting frame is folded when moving along the axial direction of the central pipe toward the top of the central pipe. According to the photography stand, the supporting frame is unfolded automatically after moving along the axial direction of the central pipe toward the bottom of the central pipe by the preset distance.

17 Claims, 18 Drawing Sheets

PHOTOGRAPHY STAND

CROSS REFERENCE TO THE RELATED APPLICATIONS

This application is based upon and claims priority to Chinese Patent Applications No. 202211078117.2, filed on Sep. 5, 2022; No. 202222392036.1, on Sep. 5, 2022; No. 202222914925.X, filed on Nov. 2, 2022; No. 202222919354.9, filed on Nov. 2, 2022; and No. 202222914910.3, filed on Nov. 2, 2022, the entire contents of which are incorporated herein by reference.

TECHNICAL FIELD

The present disclosure relates to the technical field of photographic equipment and, in particular, to a photography stand.

BACKGROUND

Cameras have been popularized gradually in the daily life of people. People are fond of photographing beautiful things in nature and sometimes spend several hours taking full-length shots with the camera. Due to environmental reasons, the camera is typically placed on a photography stand to ensure stability and quality in photography. For the prior collapsible tripods, a plurality of supporting legs are unfolded manually into the desired angle relative to an objective table in use and are unlikely to be located synchronously. The Chinese Patent Application No. CN112594516A provides a photography stand, which can be unfolded by pressing one button and folded in a drawable manner. However, this photography stand is not cost-effective due to its numerous components and complicated assembly. The present disclosure provides a device to solve the above-mentioned problems.

SUMMARY

Given this, it is desired to provide a photography stand capable of being unfolded by pressing one button.

A photography stand includes a central pipe and a supporting frame.

The top of the central pipe is configured to mount photographic equipment.

The supporting frame is connected to the central pipe and provided adjacent to the bottom of the central pipe. The supporting frame can move relative to the central pipe along the axial direction of the central pipe. The supporting frame can be unfolded when moving along the axial direction of the central pipe toward the bottom of the central pipe by a preset distance and then moving continuously toward the bottom of the central pipe. The supporting frame can be folded when moving along the axial direction of the central pipe toward the top of the central pipe.

When the photography stand provided by the present disclosure is used, the supporting frame can be driven to move along the axial direction of the central pipe toward the bottom of the central pipe. The supporting frame is unfolded when moving along the axial direction of the central pipe toward the bottom of the central pipe by the preset distance and then moving continuously toward the bottom of the central pipe, thereby supporting the photography stand. Compared with the prior photography stand in which a supporting frame is unfolded while sliding along an axial direction of a central pipe, the supporting frame of the photography stand provided by the present disclosure is unfolded automatically after moving along the axial direction of the central pipe toward the bottom of the central pipe by the preset distance. The radial size of the photography stand provided by the present disclosure is increased only after the supporting frame moves along the axial direction of the central pipe toward the bottom of the central pipe by the preset distance. Therefore, the photography stand provided by the present disclosure can be unfolded normally in some special scenarios with limited mounting space (such as a mounting space with a small middle portion and a large bottom portion) to meet user requirements. When the photography stand is not used, the supporting frame can be driven to move along the axial direction of the central pipe toward the top of the central pipe, such that the supporting frame is folded to realize less space usage of the photography stand and compact size of the folded photography stand for convenient storage and carriage.

A photography stand includes a central pipe, a supporting frame, and a locking assembly.

The central pipe is provided with a first end and a second end that are arranged along an axial direction.

The supporting frame includes a sliding seat, a plurality of supporting legs, and a second elastic member. The supporting legs are rotatably connected to the sliding seat. The second elastic member is connected to the sliding seat. The sliding seat can move between the first end and the second end along the axial direction of the central pipe, such that the supporting legs are in a folded state at the first end and in an unfolded state at the second end.

The locking assembly includes a first locking member and a second locking member, where the first locking member is provided on the central pipe, and the second locking member is provided on the supporting frame. In response to the folded state, the first locking member is extended out of the central pipe, such that the supporting frame is fixed relative to the central pipe and the second elastic member accumulates an elastic force. The second locking member can drive the first locking member to retract into the central pipe, such that the second elastic member can release the elastic force to unfold the supporting legs.

In the embodiment of the present disclosure, the first locking member ensures that the photography stand is fixed in the folded state. The elastic force of the first elastic member is accumulated in the folded state. When the photography stand is unfolded, only the second locking member is operated to release the first locking member, and the photography stand is unfolded automatically under the elastic force. Therefore, the photography stand is folded and unfolded more conveniently.

BRIEF DESCRIPTION OF THE DRAWINGS

To describe the technical solutions in the embodiments of the present disclosure or the prior art more clearly, the following briefly describes the accompanying drawings required for describing the embodiments or the prior art. It will become apparent that the accompanying drawings in the following description show some embodiments of the present disclosure, and those of ordinary skill in the art may still derive other drawings from these accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure. It will become apparent that the described embodiments are merely a part, rather than all, of the embodiments of the present disclosure. All other embodiments obtained by those of ordinary skill in the art based on the embodiments of the present disclosure without creative efforts shall fall within the protection scope of the present disclosure.

It should be noted that all the directional indications (such as upper, lower, left, right, front, and rear) in the embodiments of the present disclosure are merely used to explain relative position relationships, motion situations, and the like, of the components in a specific orientation (as shown in the figures). If the specific orientation changes, the directional indication also changes accordingly.

Moreover, the terms such as "first" and "second" used herein are only for the purpose of description and are not intended to indicate or imply relative importance or implicitly indicate the number of the indicated technical features. Thus, features limited by "first" and "second" may expressly or implicitly include at least one of the features. The term "and/or" in the specification includes three solutions. With A and/or B as an example, it includes a technical solution A, a technical solution B, and a technical solution of A and B. Further, the technical solutions of the embodiments may be combined on the basis that the combination is implementable by those of ordinary skill in the art. In the case of a combination of the technical solutions being contradictory or infeasible, such a combination is deemed nonexistent and not falling within the protection scope of the present disclosure.

First Embodiment

Figure 1:
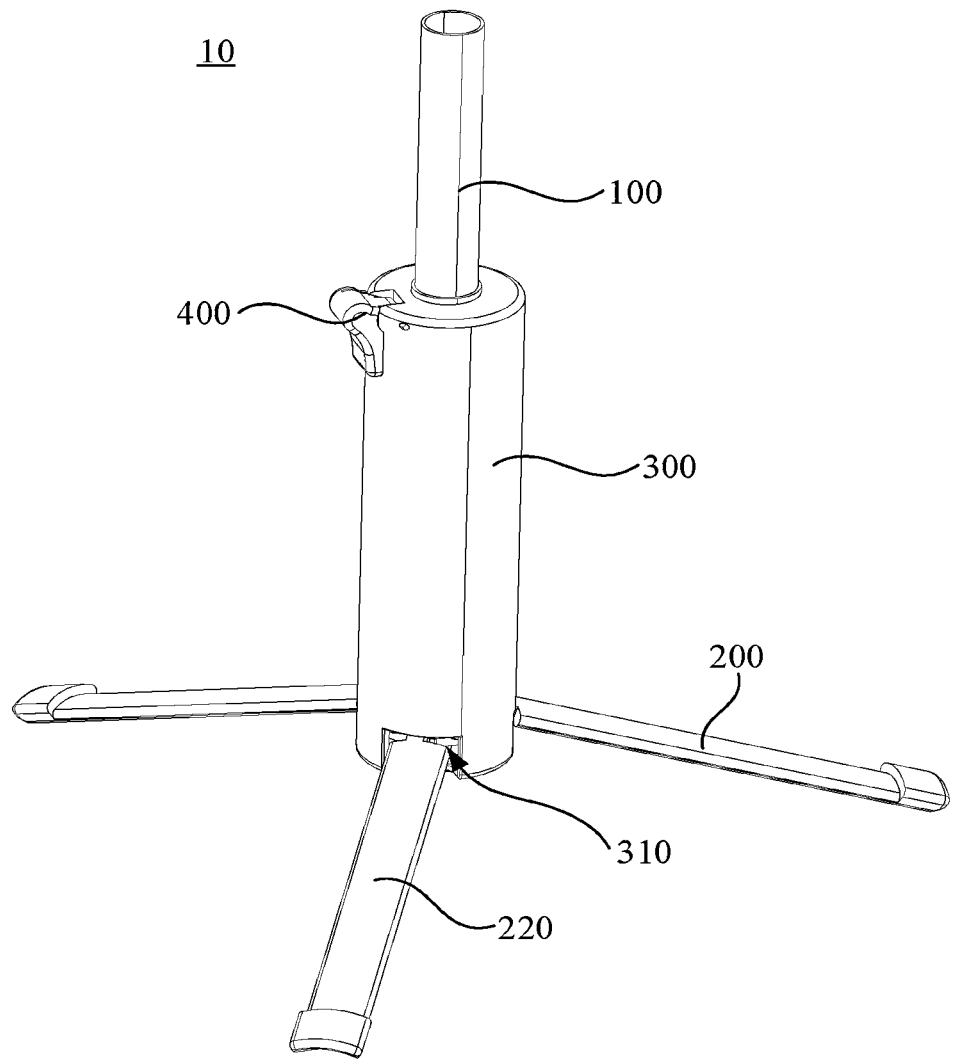
FIG. 1 is a schematic structural view of a photography stand in an unfolded state of a supporting frame according to a first embodiment.
Figure 2:
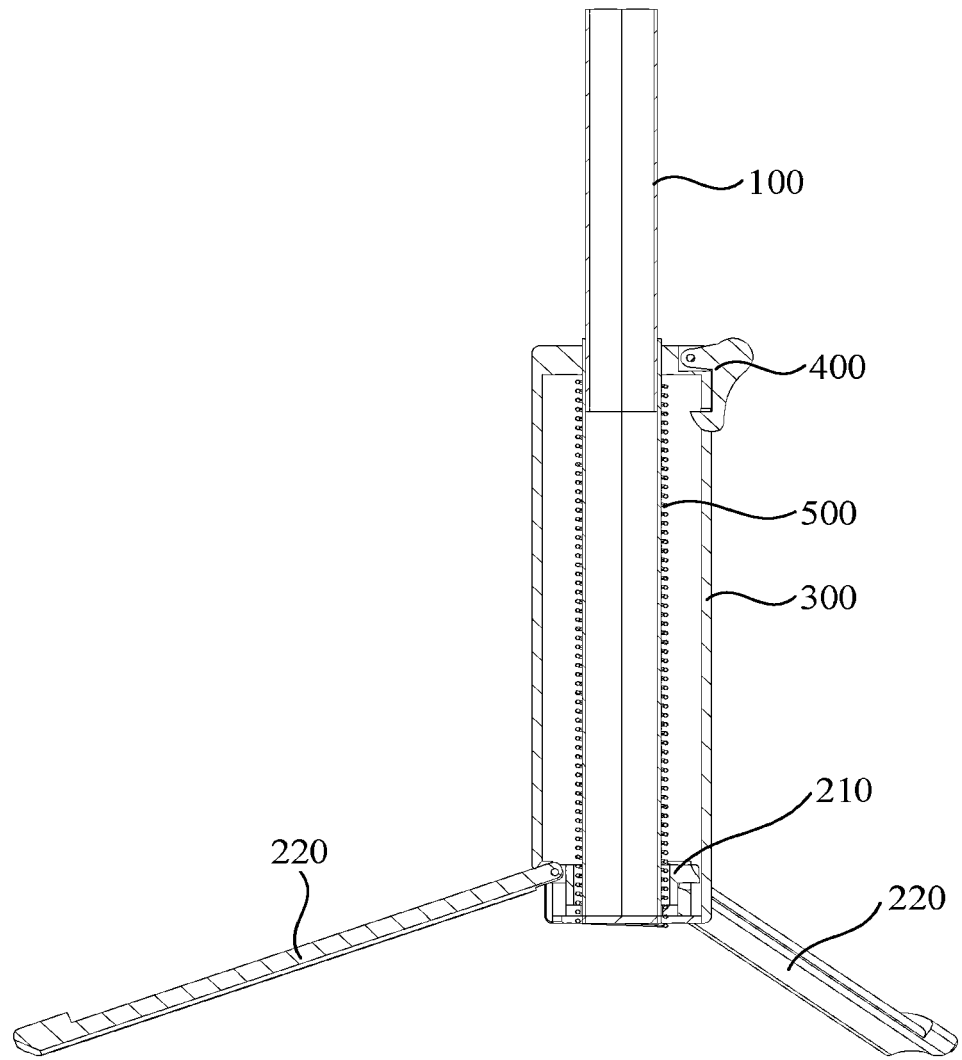
FIG. 2 is a sectional view of the photography stand in FIG. 1.

As shown in FIG. 1 and FIG. 2, the present disclosure provides photography stand 10. The photography stand 10 includes central pipe 100 and supporting frame 200. The top of the central pipe 100 is configured to mount photographic equipment. The supporting frame 200 is connected to the central pipe 100 and provided adjacent to the bottom of the central pipe 100. The supporting frame 200 can move relative to the central pipe 100 along the axial direction of the central pipe 100. The supporting frame 200 can be unfolded when moving along the axial direction of the central pipe 100 toward the bottom of the central pipe 100 by a preset distance and then moving continuously toward the bottom of the central pipe 100. The supporting frame 200 can be folded when moving along the axial direction of the central pipe 100 toward the top of the central pipe 100.

When the photography stand 10 provided by the present disclosure is used, the supporting frame 200 can be driven to move along the axial direction of the central pipe 100 toward the bottom of the central pipe 100. The supporting frame 200 is unfolded when moving along the axial direction of the central pipe 100 toward the bottom of the central pipe 100 by the preset distance and then moving continuously toward the bottom of the central pipe 100, thereby supporting the photography stand 10. Compared with the prior photography stand in which a supporting frame is unfolded while sliding along the axial direction of the central pipe, the supporting frame 200 of the photography stand 10 provided by the present disclosure is unfolded automatically after moving along the axial direction of the central pipe 100 toward the bottom of the central pipe 100 by the preset distance. The radial size of the photography stand 10 provided by the present disclosure is increased only after the supporting frame 200 moves along the axial direction of the central pipe 100 toward the bottom of the central pipe 100 by the preset distance. Therefore, the photography stand 10 provided by the present disclosure can be unfolded normally in some special scenarios with limited mounting space (such as a mounting space with a small middle portion and a large bottom portion) to meet user requirements. When the photography stand 10 is not used, the supporting frame 200 can be driven to move along the axial direction of the central pipe 100 toward the top of the central pipe 100, such that the supporting frame 200 is folded to realize less space usage of the photography stand 10 and compact size of the folded photography stand 10 for convenient storage and carriage.

Figure 3:
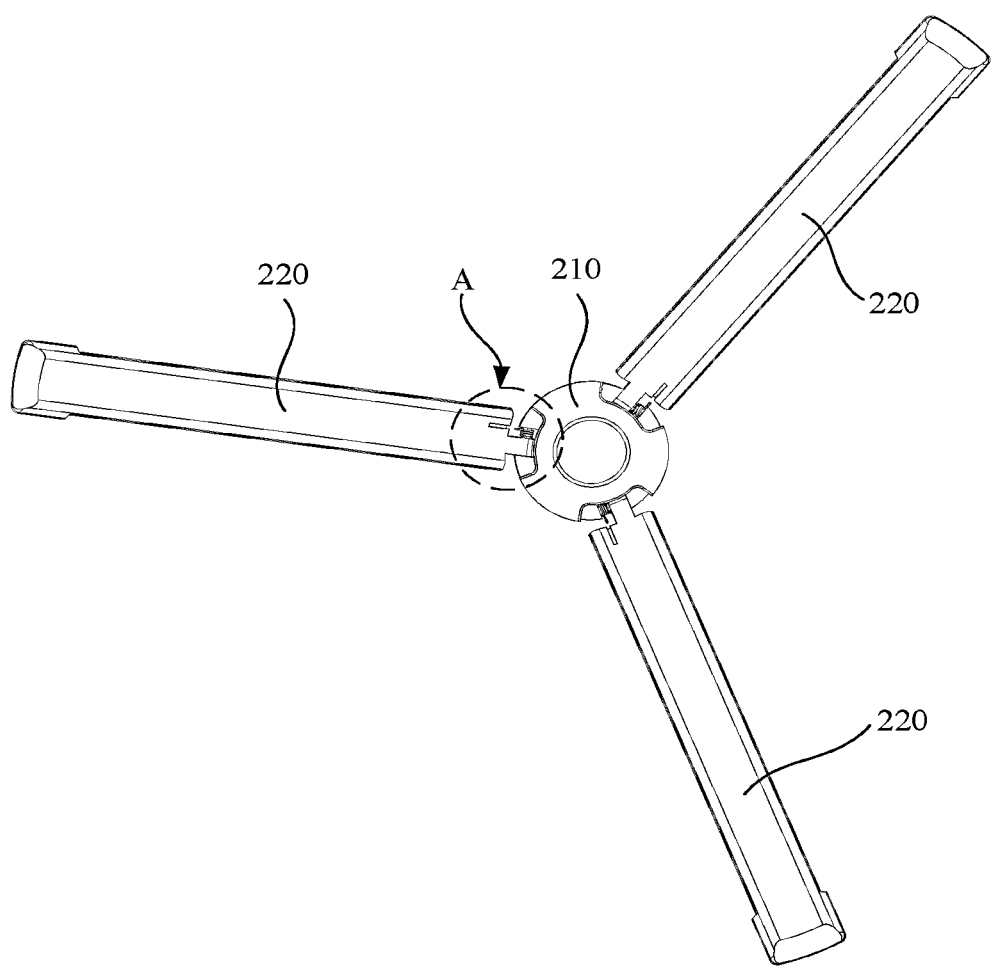
FIG. 3 is a partial structural view of the photography stand in FIG. 1.

As shown in FIG. 2 and FIG. 3, the supporting frame 200 includes sliding seat 210 and three supporting legs 220. The sliding seat 210 is slidably sleeved on the periphery of the central pipe 100. One end of each of the supporting legs 220 is rotatably connected to the sliding seat 210. The three supporting legs 220 are arranged alternately on the periphery of the sliding seat 210. When the supporting leg 220 moves with the sliding seat 210 along the axial direction of the central pipe 100 toward the bottom of the central pipe 100 by the preset distance and then moves continuously toward the bottom of the central pipe 100, the supporting leg 220 can rotate away from the central pipe 100 and is unfolded. When the supporting leg 220 moves with the sliding seat 210 along the axial direction of the central pipe 100 toward the top of the central pipe 100, the supporting leg 220 can rotate toward the central pipe 100 and is folded. It is to be noted that there may also be other numbers of the supporting legs 220, such as two, three, or even more supporting legs 220.

Specifically, when the supporting frame 200 is unfolded, only the sliding seat 210 is driven to move along the axial direction of the central pipe 100 toward the bottom of the central pipe 100. When the supporting leg 220 moves with the sliding seat 210 along the axial direction of the central pipe 100 toward the bottom of the central pipe 100 by the preset distance and then moves continuously toward the bottom of the central pipe 100, the supporting leg 220 can rotate away from the central pipe 100 and is unfolded. An included angle between the supporting leg 220 and the central pipe 100 is increased gradually. When the included angle between the supporting leg 220 and the central pipe 100 reaches a preset angle, the supporting frame 200 is unfolded to the greatest extent. When the supporting frame 200 is folded, only the sliding seat 210 is driven to move along the axial direction of the central pipe 100 toward the top of the central pipe 100. The supporting leg 220 can rotate toward the central pipe 100 and is folded. The included angle between the supporting leg 220 and the central pipe 100 is decreased gradually. When the supporting leg 220 is parallel to the central pipe 100 (namely the included angle between the supporting leg 220 and the central pipe 100 is decreased to 0°), the supporting frame 200 is folded to the greatest extent.

Specifically, as shown in FIG. 3, the three supporting legs 220 are arranged uniformly and alternately on the periphery of the sliding seat 210.

Figure 4:
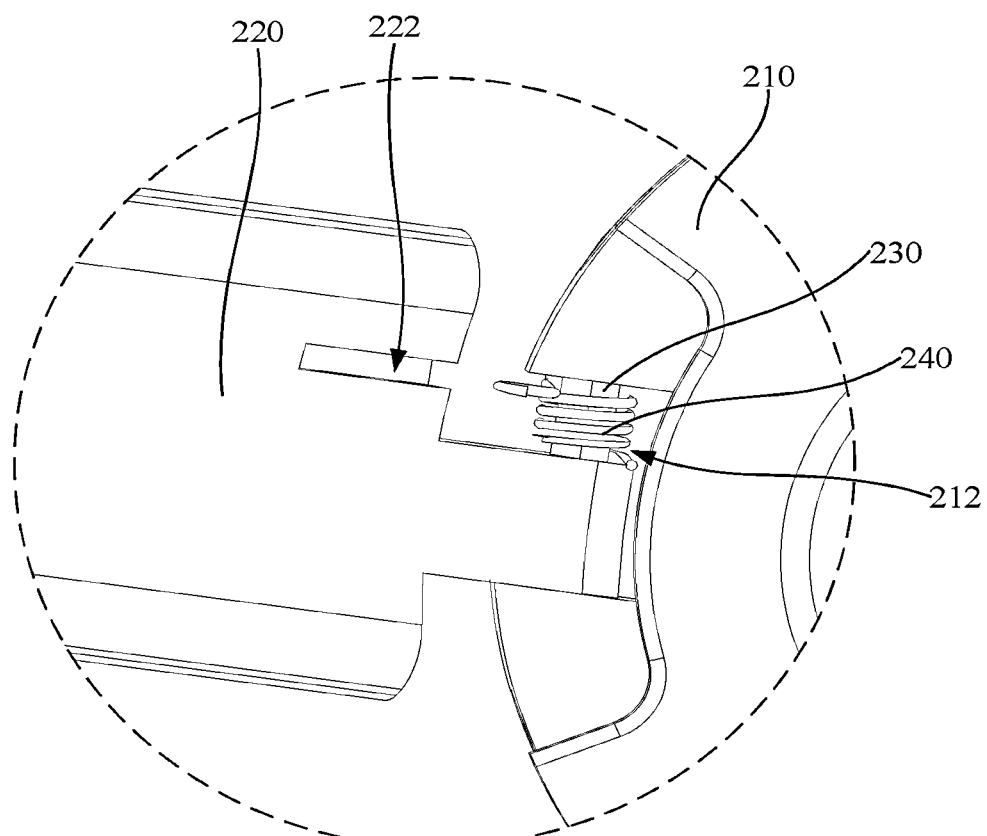
FIG. 4 is an enlarged view of A in FIG. 3.

As shown in FIG. 4, the supporting frame 200 further includes three first rotating shafts 230. One end of the supporting leg 220 is rotatably connected to the sliding seat 210 through each of the first rotating shafts 230. The supporting leg 220 can rotate relative to the sliding seat 210 around the axial direction of the first rotating shaft 230. The three first rotating shafts 230 are in one-to-one correspondence with the three supporting legs 220.

Specifically, three first mounting grooves 212 are formed alternately on the periphery of the sliding seat 210. The first rotating shaft 230 is connected between two opposite inner sidewalls of each of the first mounting grooves 212. The three first mounting grooves 212 are in one-to-one correspondence with the three first rotating shafts 230. One end of each of the supporting legs 220 is rotatably sleeved on the first rotating shaft 230.

The supporting frame 200 further includes three first elastic members 240. The first elastic member 240 is configured to provide an elastic force for the supporting leg 220 to drive the supporting leg 220 to rotate toward the central pipe 100. The three first elastic members 240 are in one-to-one correspondence with the three supporting legs 220. The first elastic member 240 ensures a natural state of the sliding seat 210 (namely there is no external force applied to the sliding seat 210). The first elastic member 240 under its elastic force can drive the supporting leg 220 to rotate away from the central pipe 100, and thus the supporting leg 220 is unfolded automatically. In addition, the supporting leg 220 is switched from an unfolded state to a folded state.

Specifically, the first elastic member 240 may be a torsional spring. The first elastic member 240 is sleeved outside the first rotating shaft 230. The first elastic member 240 includes one end abutting the supporting leg 220 and the other end abutting the sliding seat 210. Further, a side of the end of the supporting leg 220 that is sleeved on the first rotating shaft 230 abuts an inner sidewall of the first mounting groove 212. The first elastic member 240 is located between the other side of the end of the supporting leg 220 sleeved on the first rotating shaft 230 and an inner sidewall of the first mounting groove 212, where the other side of the end of the supporting leg 220 sleeved on the first rotating shaft 230 and the inner sidewall of the first mounting groove 212 are opposite to each other. Further, first clamping groove 222 is formed in the supporting leg 220. One end of the first elastic member 240 abuts the first clamping groove 222.

Figure 5:
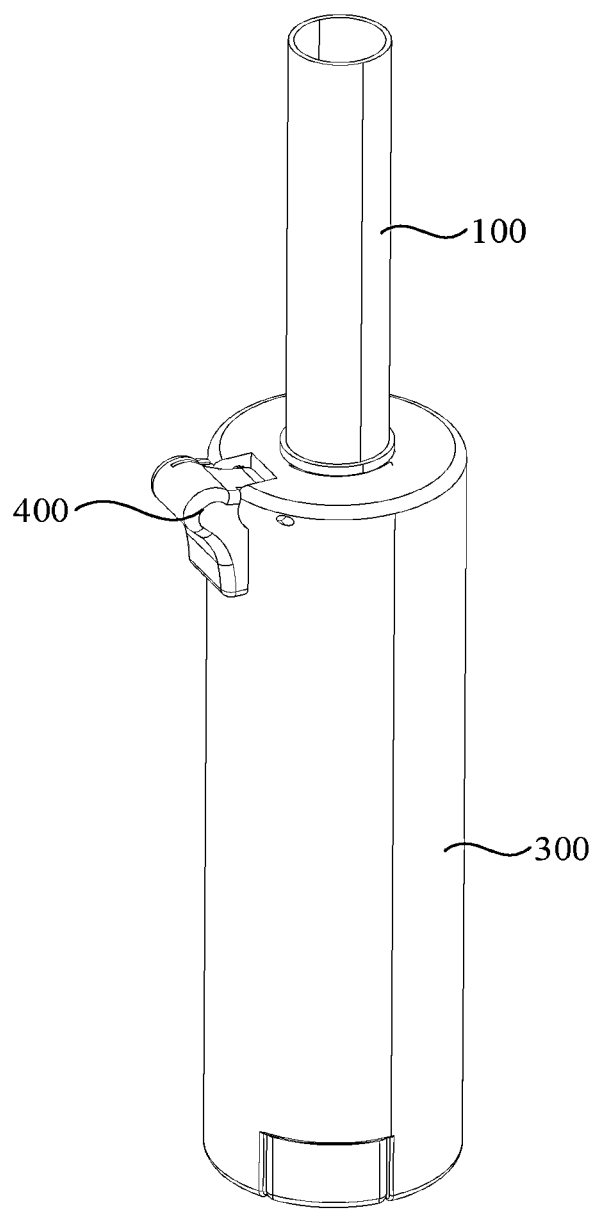
FIG. 5 is a schematic structural view of the photography stand in FIG. 1 in a folded state of the supporting frame.

As shown in FIG. 1, FIG. 2, and FIG. 5, the photography stand 10 further includes bushing 300. The bushing 300 is sleeved on the periphery of the central pipe 100. The bushing 300 is coaxial with the central pipe 100. The supporting frame 200 in the unfolded state can be extended out of the bushing 300 through the bottom opening of the bushing 300. The supporting frame 200 in the folded state can be retracted and stored in the bushing 300 through the bottom opening of the bushing 300.

Specifically, when the photography stand 10 is used, the supporting frame 200 in an unfolded state can be extended out of the bushing 300 through the bottom opening of the bushing 300. When the photography stand 10 is not used, the supporting frame 200 in a folded state is retracted and stored in the bushing 300 through the bottom opening of the bushing 300. Compared with a conventional supporting frame that is exposed outside in a folded state, the photography stand in the present disclosure is provided with the bushing 300, and the supporting frame 200 in the folded state can be stored in the bushing 300, which can make the photography stand 10 more aesthetically pleasing. Meanwhile, the bushing 300 can further protect the supporting frame 200 in the folded state, which prevents the supporting frame from impact and damage due to exposure during transportation and storage. The bushing 300 also prevents injury because the conventional supporting frame in the folded state is exposed and a gap is formed between two adjacent supporting legs of the supporting frame that easily pricks or pinches the hand.

Further, in response to the folded state of the supporting frame 200, the supporting frame 200 can be completely retracted into the bushing 300 through the bottom opening of the bushing 300, namely the supporting frame 200 in the folded state can be completely stored in the bushing 300, thereby further making the photography stand 10 more aesthetically pleasing.

In the embodiment, as shown in FIG. 2, the sliding seat 210 is slidably limited in the bushing 300, such that the sliding seat 210 is not separated from the bushing 300 through the top and bottom openings of the bushing 300 when moving along the axial direction of the central pipe 100. Specifically, to limit the sliding seat 210 in the bushing 300, the sliding seat 210 can abut the top inner wall and the bottom inner wall of the bushing 300.

Further, in response to the unfolded state of the supporting frame 200, the three supporting legs 220 of the supporting frame 200 can be extended out of the bushing 300 through the bottom opening of the bushing 300. In response to the folded state of the supporting frame 200, the three supporting legs 220 of the supporting frame 200 can be retracted into the bushing 300 through the bottom opening of the bushing 300.

Further, as shown in FIG. 1, the bottom opening of the bushing 300 includes three via holes 310 formed alternately in the bottom of the bushing 300. Through the via holes 310, the supporting legs 220 can be extended out of the bushing 300 or retracted and stored in the bushing 300. The three via holes 310 are in one-to-one correspondence with the three supporting legs 220.

Figure 6:
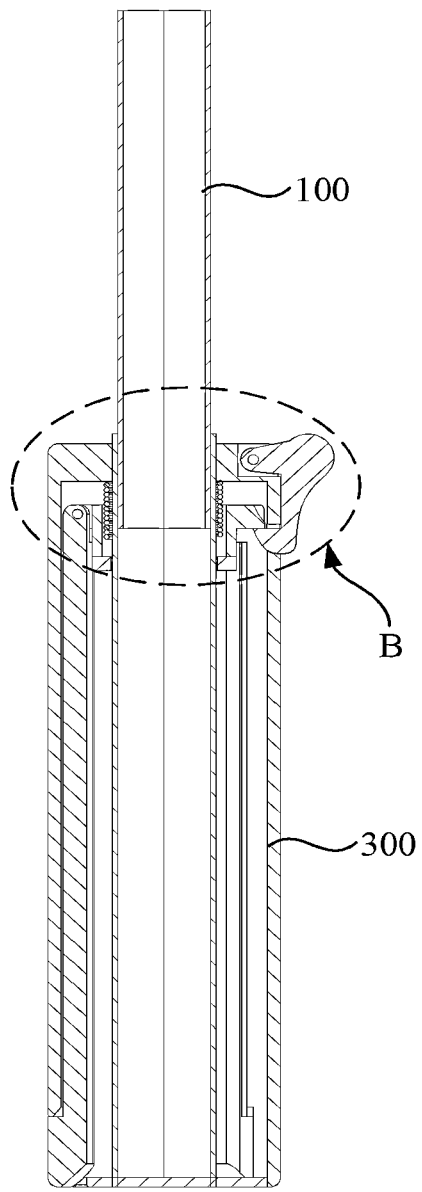
FIG. 6 is a sectional view of the photography stand in FIG. 5.

As shown in FIG. 5 and FIG. 6, the photography stand 10 further includes locking assembly 400. The locking assembly 400 has a locked state and an unlocked state. In response to the locked state of the locking assembly 400, the locking assembly 400 can lock the supporting frame 200 in the folded state to be in the bushing 300 to prevent the supporting frame 200 in the folded state from unfolding accidentally. In response to the unlocked state of the locking assembly 400, the locking assembly 400 unlocks the supporting frame 200 in the folded state, such that the supporting frame 200 in the folded state can be unfolded and the photography support 10 can be used normally.

Figure 7:
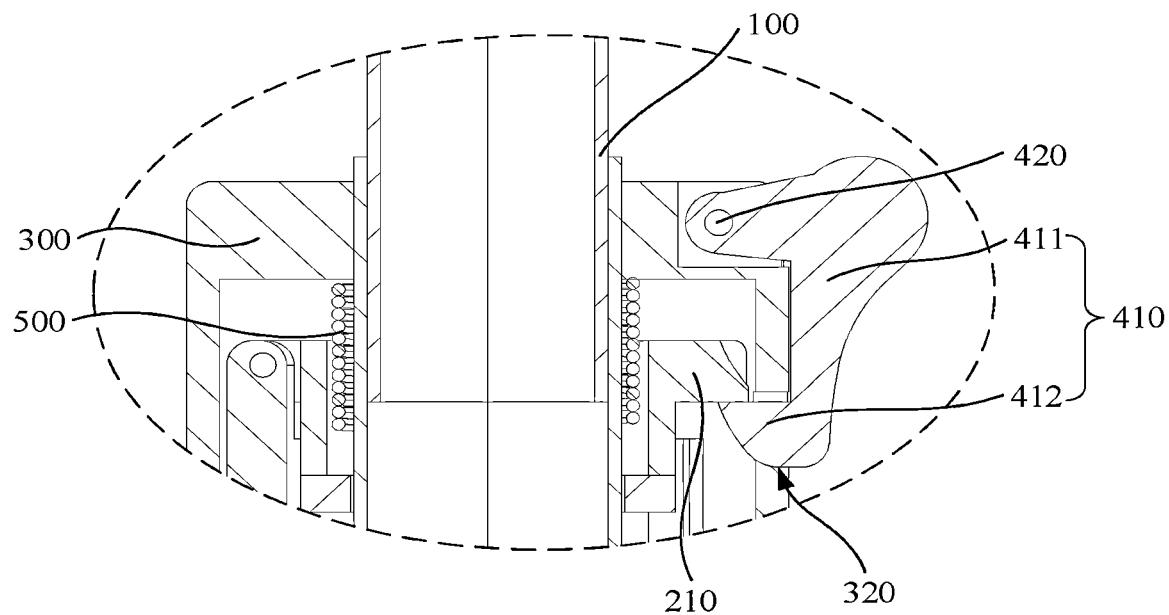
FIG. 7 is an enlarged view of B in FIG. 6.

Further, as shown in FIG. 7, through hole 320 is formed in a sidewall of the bushing 300. The locking assembly 400 includes latch 410. The latch 410 includes main body portion 411 and latching portion 412 connected to the main body portion 411. The main body portion 411 is rotatably provided on the bushing 300, such that the latch 410 is switched between a locked state and an unlocked state.

In response to the locked state of the latch 410, the latching portion 412 can be extended into the bushing 300 through the through hole 320 and clamped to the supporting frame 200 to prevent the supporting frame 200 from moving relative to the central pipe 100 and the bushing 300 along the axial direction of the central pipe 100 and lock the supporting frame 200 in the folded state to be in the bushing 300. In response to the unlocked state of the latch 410, the latching portion 412 can be extended out of the bushing 300 through the through hole 320 and separated from the supporting frame 200 to unlock the supporting frame 200 in the folded state.

Specifically, the latch 410 is in the locked state initially. The latching portion 412 of the latch 410 is extended into the bushing 300 through the through hole 320 and clamped to the supporting frame 200. The latching portion 412 can prevent the supporting frame 200 from moving relative to the central pipe 100 and the bushing 300 along the axial direction of the central pipe 100 and lock the supporting frame 200 in the folded state to be in the bushing 300.

When the photography stand 10 is used (the supporting frame 200 is switched from the folded state to the unfolded state), the main body portion 411 of the latch 410 can be driven to allow the latching portion 412 to rotate away from the through hole 320. Consequently, the latch 410 is switched from the locked state to the unlocked state. The latching portion 412 is extended out of the bushing 300 through the through hole 320 and separated from the supporting frame 200, thereby unlocking the supporting frame 200 in the folded state. In this case, the supporting frame 200 can be driven to move along the axial direction of the central pipe 100 toward the bottom of the central pipe 100, such that the supporting frame 200 is extended out of the bushing 300 through the bottom opening of the bushing 300 when moving along the axial direction of the central pipe 100 toward the bottom of the central pipe 100 by the preset distance and then moving continuously toward the bottom of the central pipe 100, and thus the supporting frame 200 is unfolded.

Specifically, as shown in FIG. 7, in response to the locked state of the latch 410, the latching portion 412 can be clamped to the sliding seat 210 to prevent the sliding seat 210 from moving relative to the central pipe 100 and the bushing 300 along the axial direction of the central pipe 100 and lock the supporting frame 200 in the folded state to be in the bushing 300.

Figure 8:
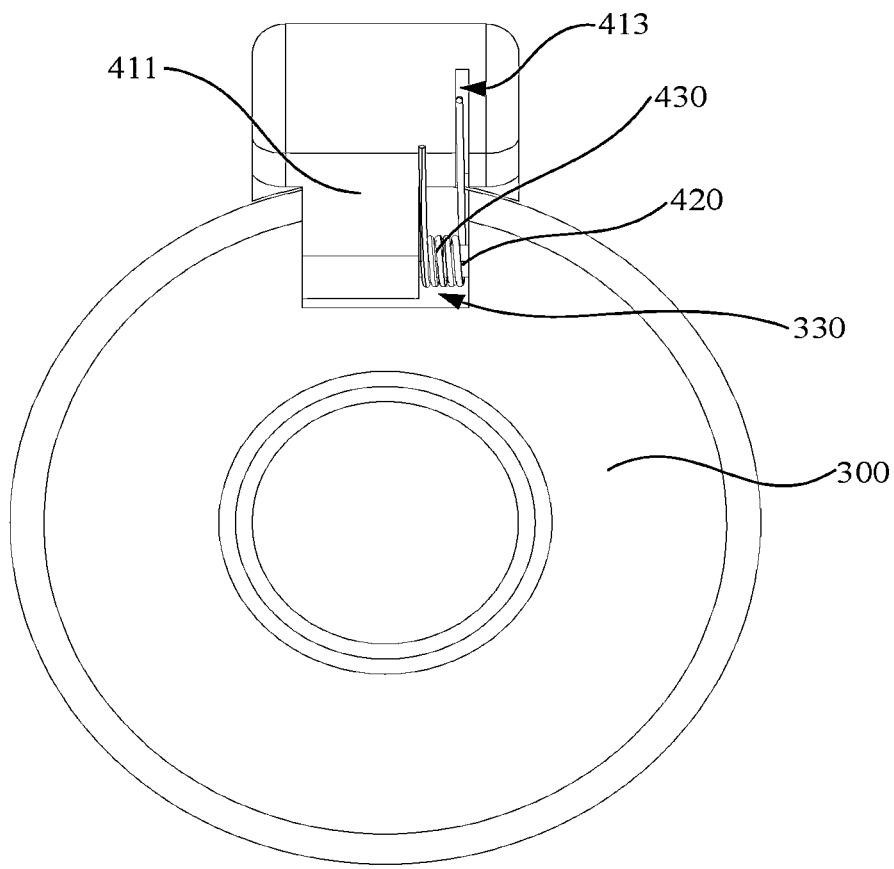
FIG. 8 is a schematic structural view of the photography stand in FIG. 5 from another perspective.

As shown in FIG. 7 and FIG. 8, the top of the main body portion 411 is rotatably provided on the bushing 300. Specifically, the top of the main body portion 411 is rotatably provided on the top of the bushing 300. A side of the main body portion 411 away from the bushing 300 is a curved surface. The top of the main body portion 411 is thicker than the bottom of the main body portion 411.

The latching portion 412 is provided at the bottom of the main body portion 411 and located at the side of the main body portion 411 facing toward the bushing 300. The side of the latching portion 412 facing toward the bushing 300 is a curved surface, which allows the latching portion 412 to move into or out of the bushing 300 through the through hole 320 more smoothly and can further reduce the risk of scratching the surfaces of the bushing 300 and the supporting frame 200. Specifically, in the embodiment, the main body portion 411 and the latching portion 412 are formed integrally for ease of machining of the latch 410.

The locking assembly 400 further includes second rotating shaft 420. The main body portion 411 is rotatably provided on the bushing 300 through the second rotating shaft 420. The main body portion 411 can rotate relative to the bushing 300 around an axial direction of the second rotating shaft 420.

Specifically, the top of the main body portion 411 is rotatably provided on the bushing 300 through the second rotating shaft 420. Second mounting groove 330 is formed at the top of the bushing 300. The second rotating shaft 420 is connected between two opposite inner sidewalls of the second mounting groove 330. The top of the main body portion 411 is rotatably sleeved on the second rotating shaft 420.

As shown in FIG. 8, the locking assembly 400 further includes third elastic member 430. The third elastic member 430 is configured to provide an elastic force for the main body portion 411, such that the main body portion 411 drives the latching portion 412 to rotate toward the through hole 320, and the latching portion 412 is extended into the bushing 300 through the through hole 320 and clamped to the supporting frame 200. The third elastic member 430 ensures the natural state of the latch 410 (namely there is no external force applied to the latch 410). The third elastic member 430 under its elastic force can allow the main body portion 411 to drive the latching portion 412 to rotate toward the through hole 320. Consequently, the latching portion 412 is extended into the bushing 300 through the through hole 320 and clamped to the supporting frame 200, the latch 410 is switched to the locked state, and the supporting frame 200 in the folded state is locked in the bushing 300. In addition, when the latch 410 is switched from the locked state to the unlocked state, an elastic force applied by the third elastic member 430 to the main body portion 411 is overcome through an external force of a user, allowing the main body portion 411 to drive the latching portion 412 to rotate away from the through hole 320. Consequently, the latching portion 412 is extended out of the bushing 300 through the through hole 320 and separated from the supporting frame 200.

Specifically, the third elastic member 430 may be a torsional spring. The third elastic member 430 is sleeved outside the second rotating shaft 420 with two ends abutting the main body portion 411. Further, a side of an end (namely the top of the main body portion 411) of the main body portion 411 sleeved on the second rotating shaft 420 abuts an inner sidewall of the second mounting groove 330. The third elastic member 430 is located between the other side of the end of the main body portion 411 sleeved on the second rotating shaft 420 and an inner sidewall of the second mounting groove 330, where the other side of the end of the main body portion 411 sleeved on the second rotating shaft 420 and the inner sidewall of the second mounting groove 330 are opposite to each other. Further, second clamping groove 413 is formed in the main body portion 411. One end of the third elastic member 430 abuts the second clamping groove 413.

As shown in FIG. 2 and FIG. 7, the photography stand 10 further includes second elastic member 500. The second elastic member 500 is provided in the bushing 300. The second elastic member 500 is configured to drive the supporting frame 200 to move along the axial direction of the central pipe 100 toward the bottom of the central pipe 100. The second elastic member 500 ensures the natural state of the supporting frame 200 (there is no external force applied to the supporting frame 200). For example, in some scenarios, after the latch 410 is switched from the locked state to the unlocked state, the second elastic member 500 under its elastic force can drive the supporting frame 200 to move along the axial direction of the central pipe 100 toward the bottom of the central pipe 100. The supporting frame 200 is extended out of the bushing 300 through the bottom opening of the bushing 300 when moving along the axial direction of the central pipe 100 toward the bottom of the central pipe 100 by the preset distance and then moving continuously toward the bottom of the central pipe 100, and the supporting frame 200 is unfolded automatically, which makes the photography stand 10 more automatic and portable. In addition, when the supporting frame 200 is switched from the unfolded state to the folded state, an elastic force applied by the second elastic member 500 to the supporting frame 200 is overcome by an external force of the user, thereby driving the supporting frame 200 to move along the axial direction of the central pipe 100 toward the top of the central pipe 100 and switching the supporting frame 200 to the folded state. The supporting frame 200 in the folded state is retracted and stored in the bushing 300 through the bottom opening of the bushing 300.

Specifically, the second elastic member 500 may be a compression spring. The second elastic member 500 is sleeved on the periphery of the central pipe 100. The second elastic member 500 includes one end abutting the top inner wall of the bushing 300 and the other end abutting the sliding seat 210. The second elastic member 500 is configured to provide an elastic force for the sliding seat 210 to drive the sliding seat 210 to move relative to the central pipe 100 and the bushing 300 along the axial direction of the central pipe 100 toward the bottom of the central pipe 100.

Figure 9:
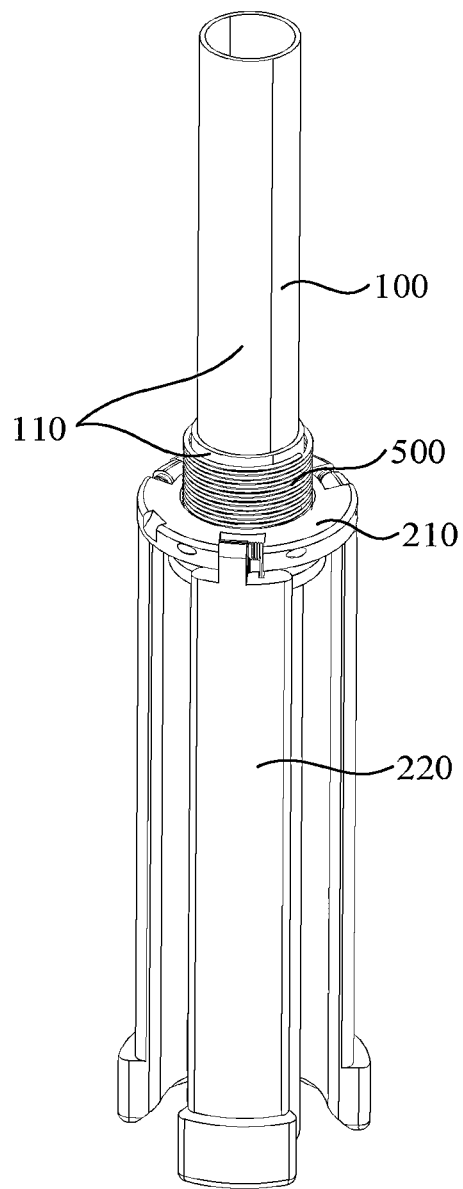
FIG. 9 is a partial view of the structure of the photography stand in FIG. 5.
Figure 10:
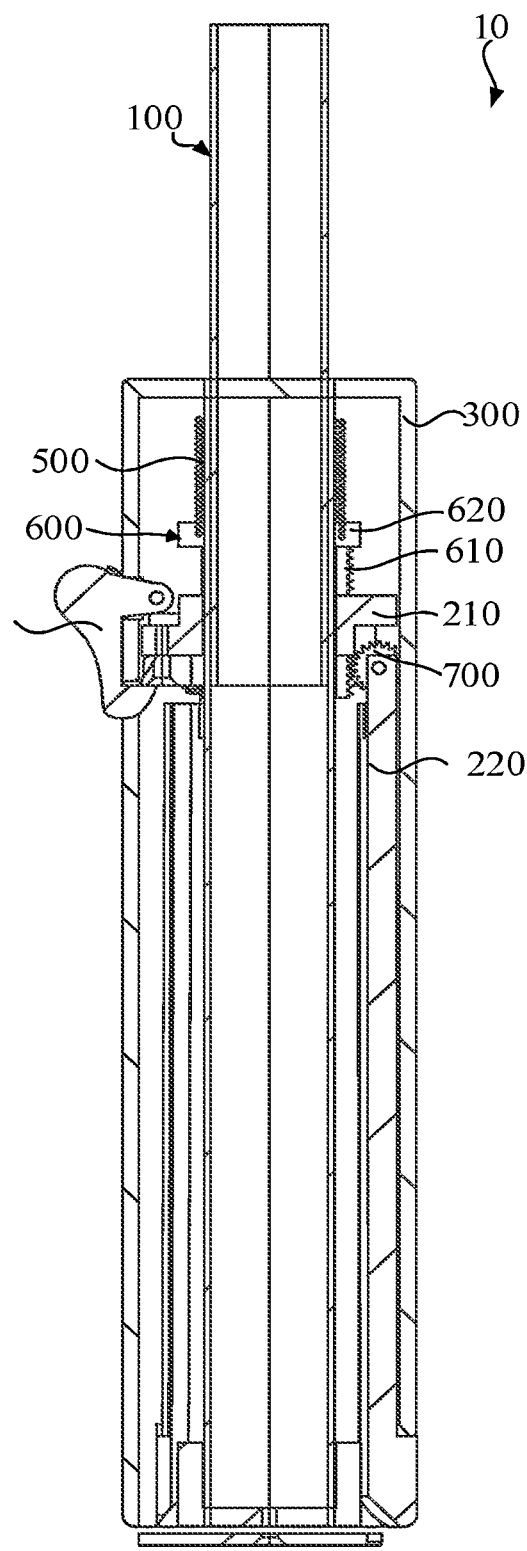
FIG. 10 is a schematic sectional view of a photography stand according to a second embodiment.
Figure 11:
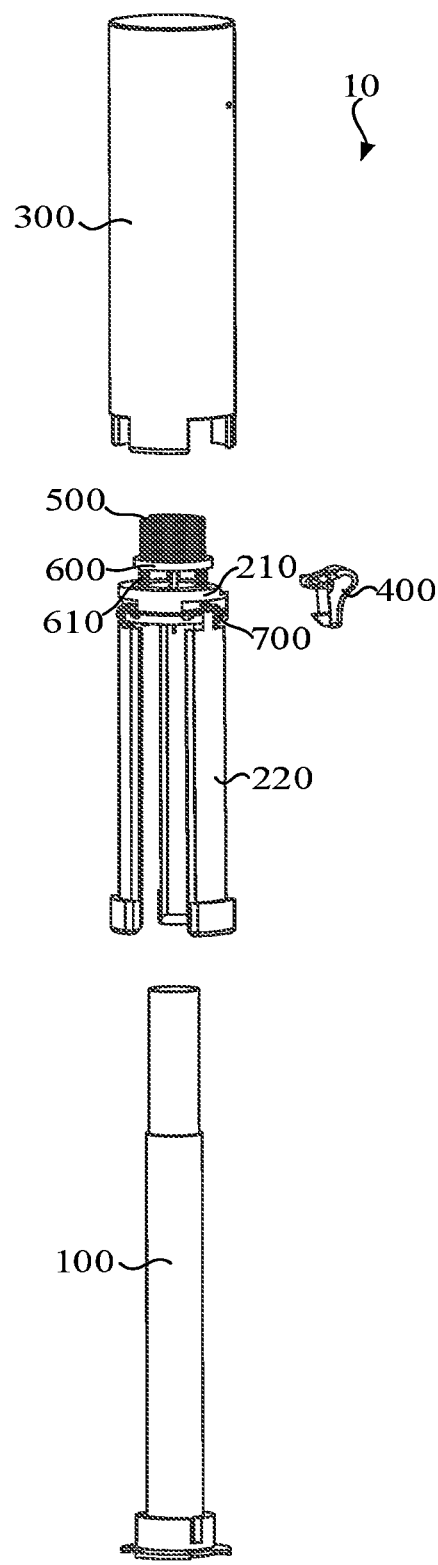
FIG. 11 is a schematic exploded view of a photography stand in a folded state according to a second embodiment.

Further, as shown in FIG. 9, the central pipe 100 includes a plurality of sequentially sleeved connecting pipes 110. One of the connecting pipes 110 can be extended or retracted relative to an adjacent one of the connecting pipes 110 along the axial direction of the central pipe 100, such that a supporting length of the central pipe 100 is adjustable along the axial direction of the central pipe 100. Specifically, there is a need to frequently adjust the height of photographic equipment at the top of the central pipe 100 in a photographing or shooting process. By sequentially sleeving the plurality of connecting pipes 110, the height of the photographic equipment at the top of the central pipe 100 can be adjusted through the supporting length of the central pipe 100. In an embodiment, the top of the central pipe 100 is connected to a gimbal, on which the photographic equipment can be mounted.

Second Embodiment

Referring to FIG. 10 to FIG. 13, FIG. 10 to FIG. 13 illustrate a second embodiment of the photography stand 10.

The photography stand 10 of the embodiment is structurally similar to that of the first embodiment, except for the driving principle that the supporting legs 220 are unfolded at the bottom of the bushing 300. In the embodiment, the first elastic members 240 in the first embodiment may not be provided at the tail ends of the supporting legs 220, namely automatic expansion of the supporting legs 220 unnecessarily depends on the spring force. Instead, the photography stand 10 in the embodiment further includes drive slider 600 and gears 700. The drive slider 600 is provided on the central pipe 100 and can move along the axial direction of the central pipe 100. The drive slider 600 is adjacent to the top of the bushing 300 and is connected to the bushing 300 through the second elastic member 500. The drive slider 600 includes racks 610. The second elastic member 500 can release the elastic force, such that the drive slider 600 drives the sliding seat 210 to move along the axial direction of the central pipe 100 toward the bottom of the central pipe 100. The gears 700 are fixedly connected to the tail ends of the supporting legs 220. The gears 700 and the racks 610 are in one-to-one correspondence with the supporting legs 220 quantitatively. When the drive slider 600 drives the sliding seat 210 to move to the bottom of the bushing 300, the racks 610 continuously move relative to the sliding seat 210 along the axial direction. While moving along the axial direction, the racks 610 can drive the gears 700 to rotate, thereby unfolding the supporting frame 200.

Figure 12:
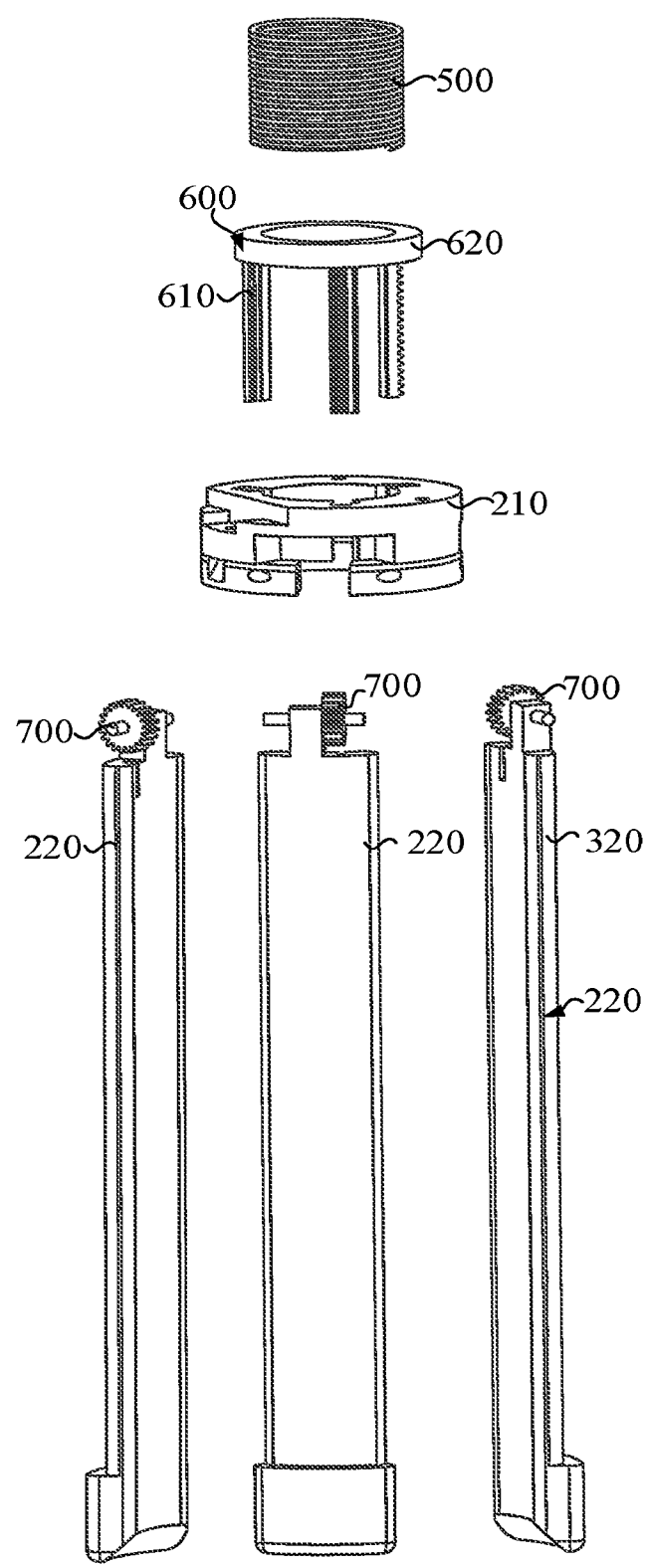
FIG. 12 is a partial exploded view of the photography stand in FIG. 11.

It is to be noted that the drive slider 600 further includes fixed seat 620. The racks 610 are arranged at a side of the fixed seat 620 away from the second elastic member 500 with a length extension direction parallel to the axial direction of the central pipe 100. As shown in FIG. 6, the fixed seat 620 is a hollow structure in which two ends are open. The fixed seat 620 is sleeved on the central pipe 100. Along the axial direction, the fixed seat 620 can drive the racks 610 to move synchronously. It is to be understood that the fixed seat 620 may further cooperate with a slide rail of the central pipe 100 in other embodiments. In this case, the fixed seat 620 may be provided side by side with the central pipe 100, rather than sleeved on the central pipe 100. The fixed seat 620 is a cylindrical structure. It is to be understood that the fixed seat 620 may be a square structure, a cuboid structure, and the like, in other embodiments. There are no limits made on the outline structure of the fixed seat 620 in the present disclosure. When the fixed seat 620 is cylindrical, the fixed seat 620 can better cooperate with the inner wall of the bushing 300. As shown in FIG. 12, a plurality of racks 610 are arranged alternately along the circumference of the fixed seat 620. It is to be understood that there may further be one rack 610, two racks, etc.

Figure 13:
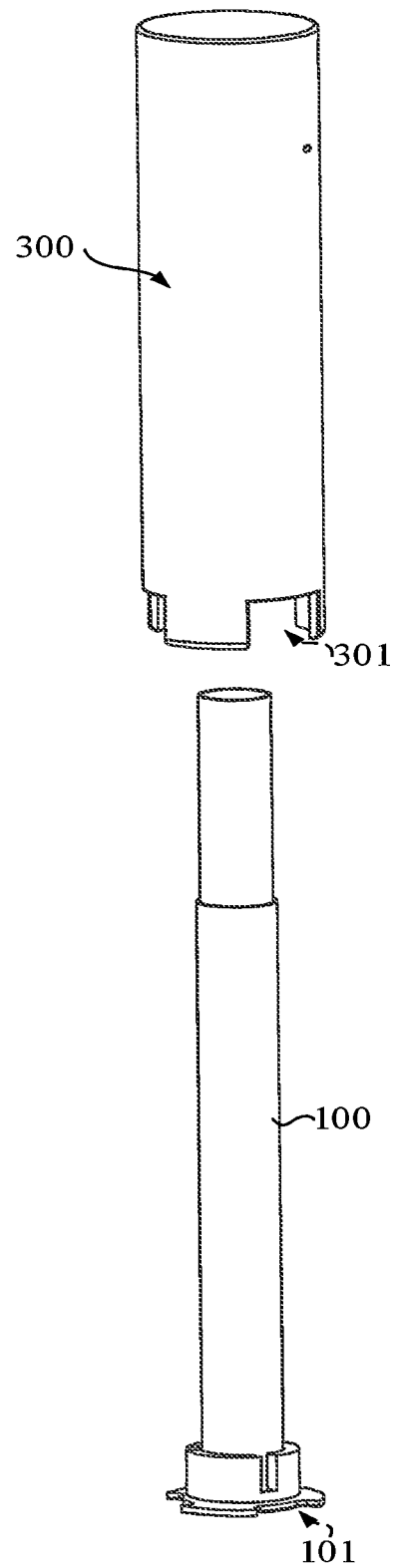
FIG. 13 is a schematic exploded view of a photography stand without a supporting frame according to a second embodiment.

In an embodiment, as shown in FIG. 13, a plurality of first openings 301 are formed at the bottom of the bushing 300. The first openings 301 are in one-to-one correspondence with the supporting legs 220 quantitatively. The plurality of first openings 301 are arranged alternately along the circumference of the bushing 300. The supporting legs 220 can penetrate through the first openings 301, such that the supporting legs 220 can be unfolded on the periphery of the bushing 300. A plurality of second openings 101 are formed at the bottom of the central pipe 100. The second openings 101 are in one-to-one correspondence with the first openings 301 quantitatively. The plurality of second openings 101 are arranged alternately along the circumference of the central pipe 100. The supporting legs 220 can penetrate through the second openings 101, such that the supporting legs 220 can be unfolded on the periphery of the bushing 300.

Third Embodiment

Figure 14:
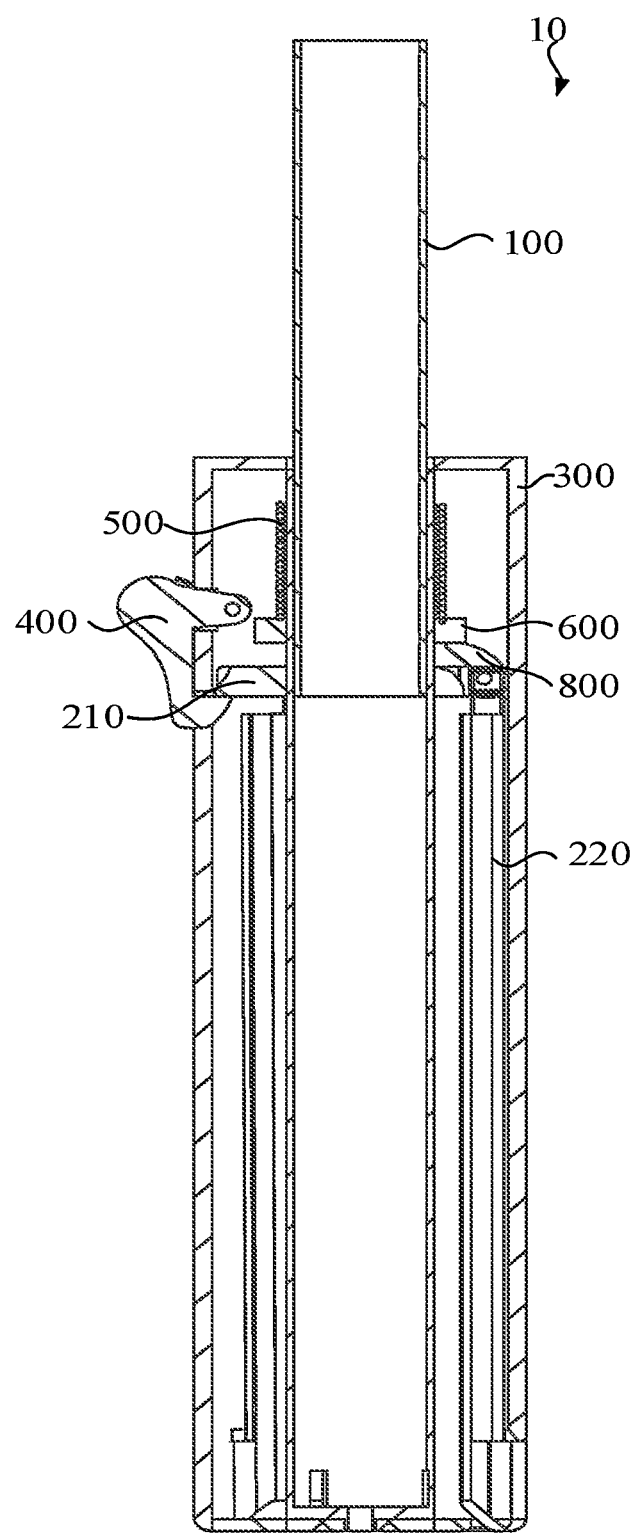
FIG. 14 is a schematic sectional view of a photography stand according to a third embodiment.
Figure 15:
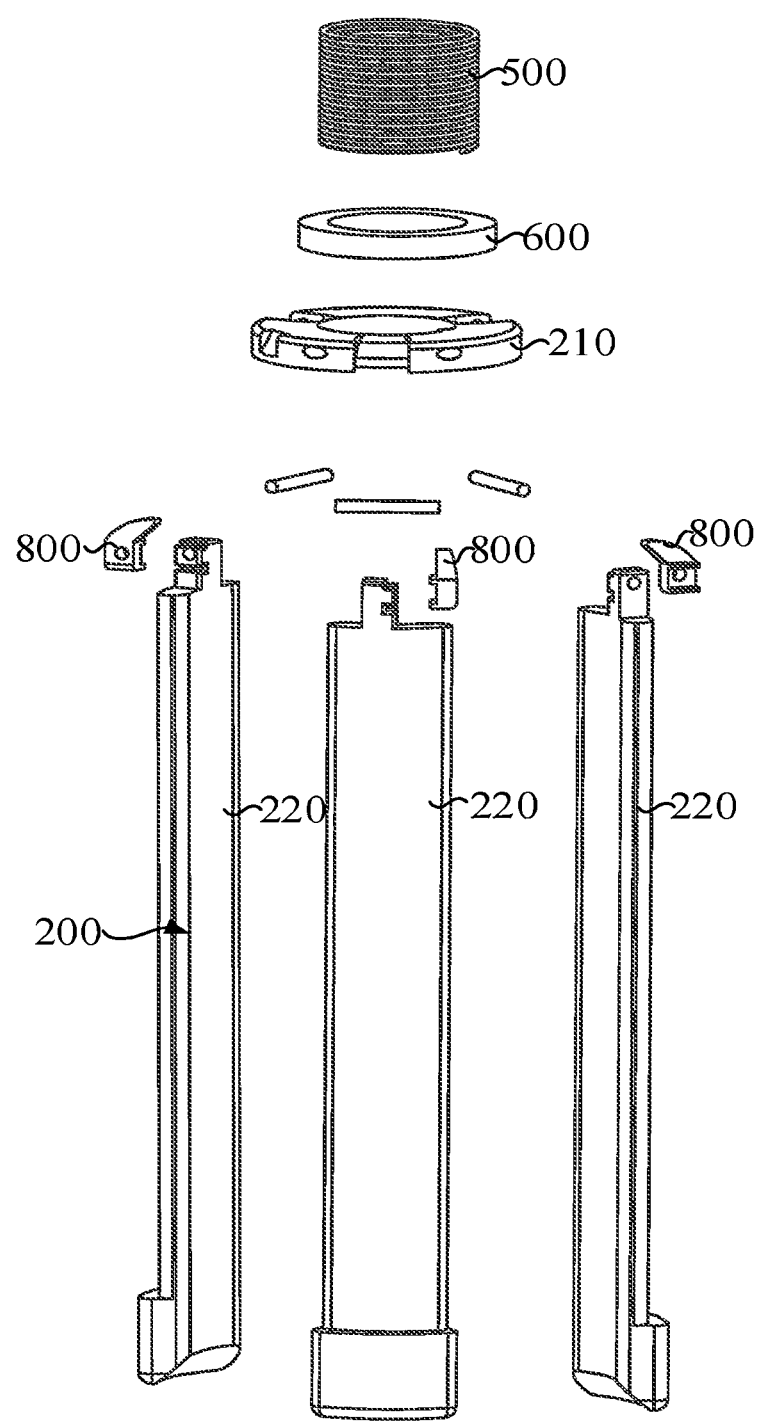
FIG. 15 is a partial exploded view of a photography stand according to a third embodiment.

Referring to FIG. 14 and FIG. 15, FIG. 14 and FIG. 15 illustrate a third embodiment of the photography stand 10.

The photography stand 10 of the embodiment is structurally similar to that of the second embodiment, except for the driving principle that the supporting legs 220 are unfolded at the bottom of the bushing 300. In the embodiment, the gears 700 at the tail ends of the supporting legs 220 can be replaced by cams 800. The cams 800 are connected and fixed with the tail ends of the supporting legs 220. In response to the folded state of the supporting frame 200, the cams 800 are protrusively provided on the sliding seat 210. The drive slider 600 is provided on the central pipe 100 and can move along the axial direction of the central pipe 100. The drive slider 600 is adjacent to the top of the bushing 300 and is connected to the bushing 300 through the second elastic member 500. The second elastic member 500 can release the elastic force, such that the drive slider 600 drives the sliding seat 210 to move along the axial direction of the central pipe 100. While the drive slider 600 drives the sliding seat 210 to move to the bottom of the bushing 300, the drive slider 600 moves continuously along the axial direction relative to the sliding seat 210 and the cams. The drive slider 600 applies an external force to the cams 800, such that the cams 800 drives the supporting legs 220 to rotate and unfold at the bottom of the bushing 300.

Fourth Embodiment

Referring to FIG. 16 to FIG. 19, FIG. 16 to FIG. 19 illustrate a fourth embodiment of the photography stand 10.

Figure 16:
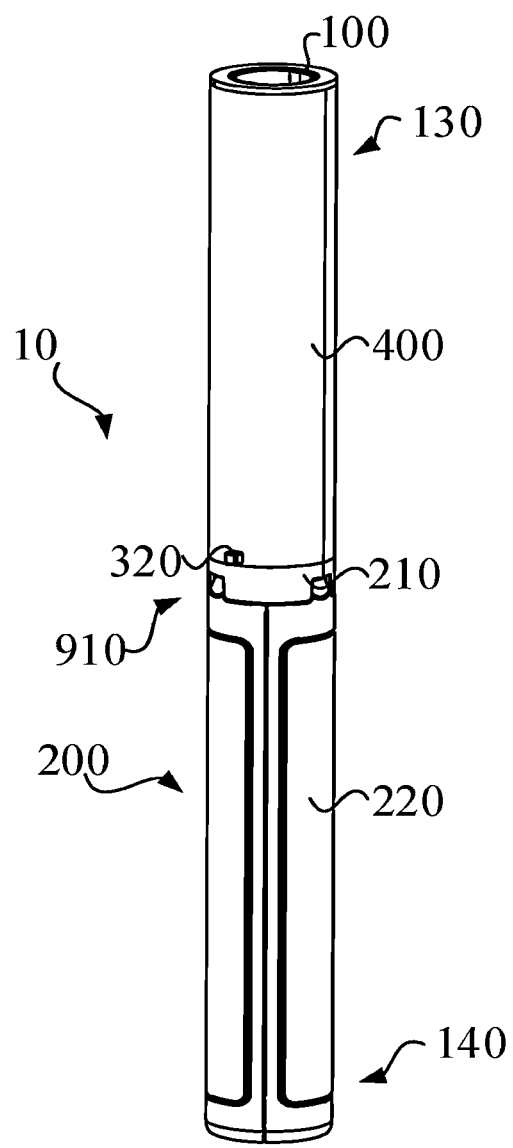
FIG. 16 is a schematic structural view of a photography stand in a folded state according to a fourth embodiment.
Figure 17:
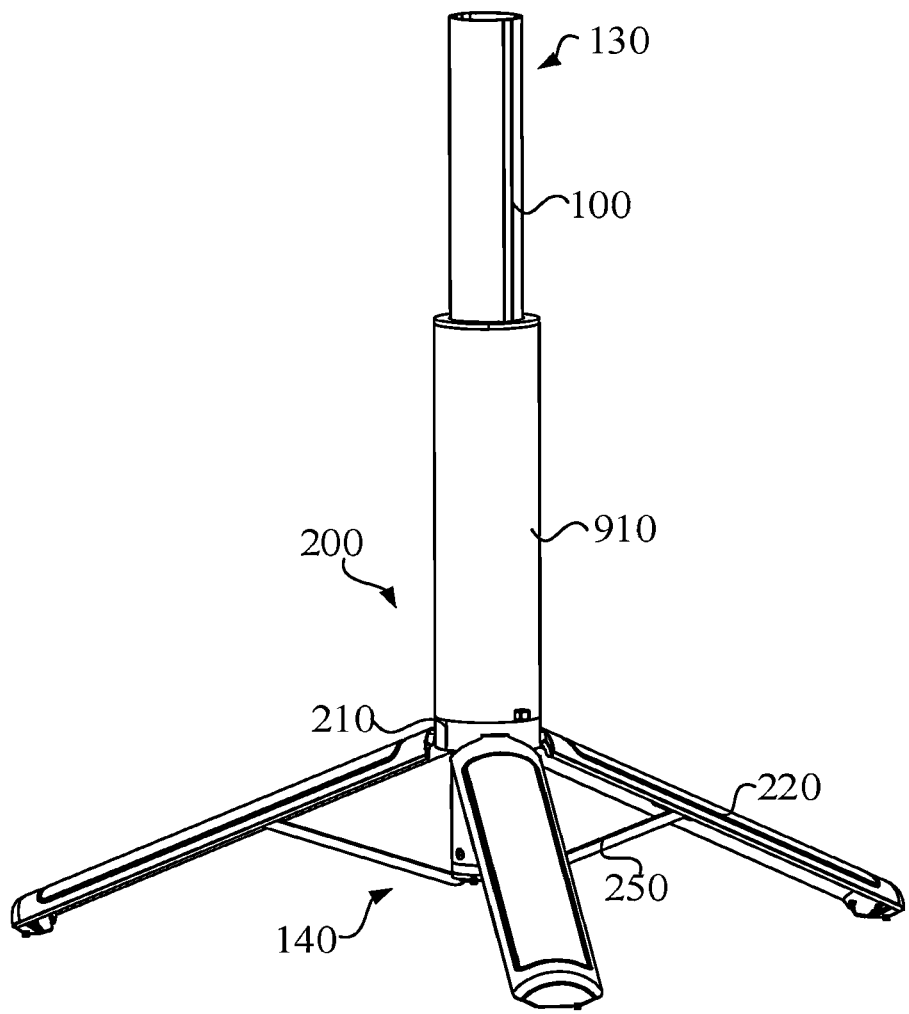
FIG. 17 is a schematic structural view of the photography stand in an unfolded state in FIG. 16.

Referring to FIG. 16, the embodiment provides photography stand 10 for mounting photographic equipment. The photographic equipment may be, but is not limited to, a camera or a mobile phone. By manipulating the photography stand 10 by hand, the photography stand 10 can be folded and unfolded. Referring to FIG. 16, in response to the folded state of the photography stand 10, the photography stand 10 can be held by a single hand and stored conveniently. Referring to FIG. 17, in response to an unfolded state of the photography stand 10, the photography stand 10 can support the photographic equipment on a flat or rugged table or ground.

Figure 18:
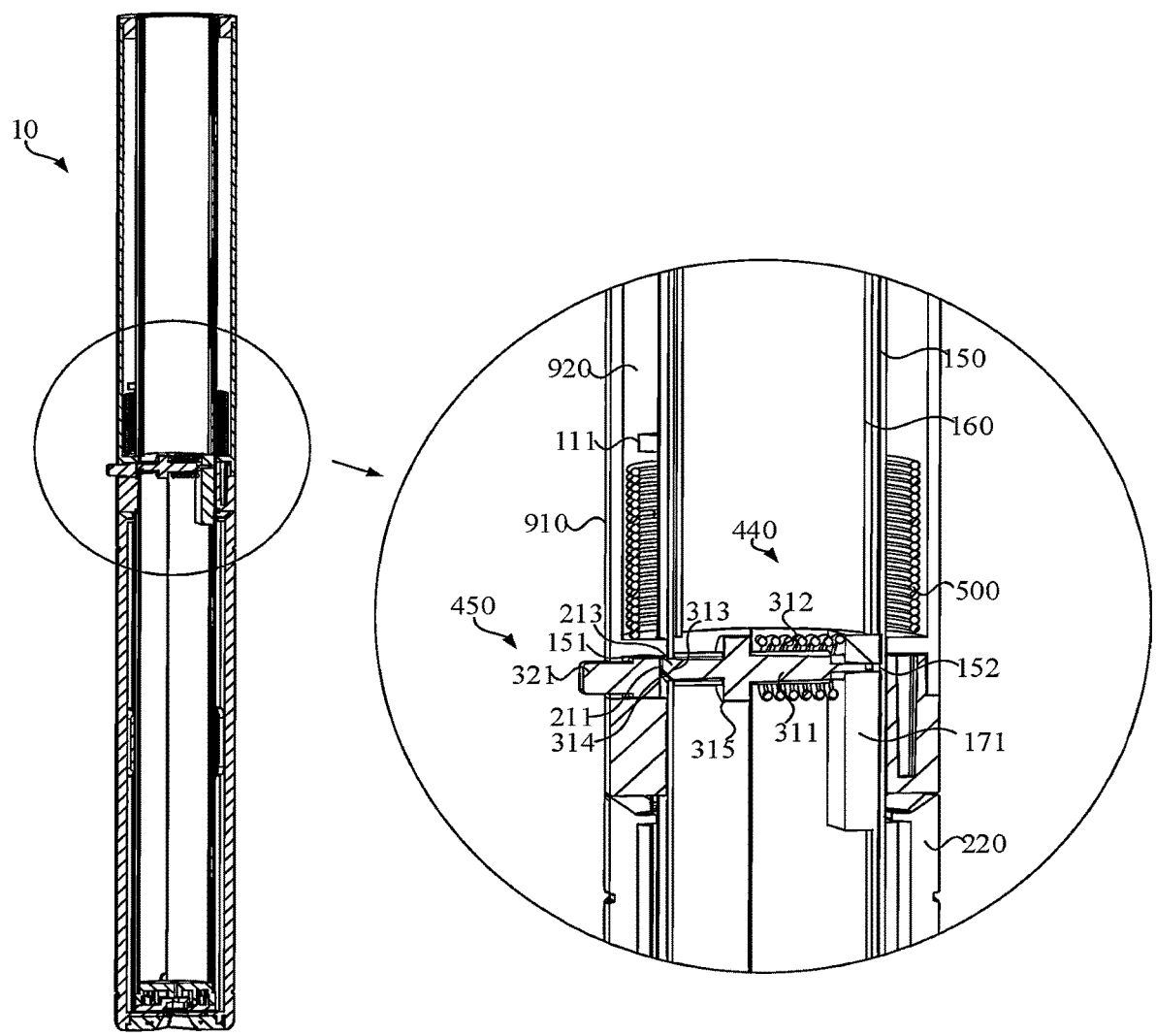
FIG. 18 is a partial sectional enlarged view of the photography stand in FIG. 16.

Referring to FIG. 17 and FIG. 18, the photography stand 10 includes central pipe 100, supporting frame 200, and locking assembly 400. The central pipe 100 is provided with first end 130 and second end 140 that are arranged along an axial direction. The first end 130 can be understood as an end for mounting the photographic equipment, while the second end 140 can be understood as an end facing toward or adjacent to the ground or the table. The supporting frame 200 can move between the first end 130 and the second end 140 along the axial direction of the central pipe 100, such that the supporting frame 200 is in a folded state at the first end 130 and in an unfolded state at the second end 140. The locking assembly 400 is configured to keep a relative fixation between the supporting frame 200 and the central pipe 100 in the folded state. The locking assembly 400 can further unlock the relative fixation between the supporting frame 200 and the central pipe 100, such that the supporting frame 200 can be unfolded.

The top of the central pipe 100 refers to a part for mounting the photographic equipment. A mounting seat with a fast-assembling structure may be provided at the top of the central pipe 100. The fast-assembling structure may include at least one of a cold shoe, a gimbal, a threaded shaft, and a threaded hole. The central rod 100 may be provided with a photography accessory through the fast-assembling structure on the mounting seat. A material of the central pipe 100 may be, but is not limited to, alloy, stainless, plastic, etc. The central pipe 100 is a hollow structure, which makes the photography stand lighter and can accommodate other components of the photography stand. In an embodiment, the central pipe 100 includes first pipe 150 and second pipe 160. The second pipe 160 is located in the first pipe 150 and can be extended out of or retracted into the central pipe 100. According to photographing requirements of users, the height of the central pipe 100 can be adjusted through expansion and retraction of the second pipe 160 in the first pipe 150.

The supporting frame 200 includes sliding seat 210, a plurality of supporting legs 220, and second elastic member 500. The plurality of supporting legs 220 are rotatably connected to the sliding seat 210. The sliding seat 210 can move between the first end 130 and the second end 140 along the axial direction of the central pipe 100, such that the supporting legs 220 are in the folded state at the first end 130 and in the unfolded state at the second end 140. The second elastic member 500 is connected to the sliding seat 210. The second elastic member 500 can accumulate an elastic force in the folded state. As shown in FIG. 18, the second elastic member 500 is located at a side of the sliding seat 210 away from the supporting legs 220. A position of the central pipe 100 adjacent to the first end 130 is provided with bump 111. In response to the folded state, the second elastic member 500 is compressed between the bump 111 and the sliding seat 210. The bump 111 serves as a limiting member near the first end 130 of the central pipe 100, a function of which is to limit the second elastic member 500 and squeeze the second elastic member 500 when the second elastic member 500 moves near the bump. In other embodiments, the bump 111 may be set as a limiting member in other forms. It is to be understood that the second elastic member 500 may also be provided at a side of the sliding seat 210 facing toward the supporting legs 220 in other embodiments. In this case, the second elastic member 500 includes one end fixedly connected to the sliding seat 210 and the other end fixedly connected to the central pipe 100. In response to the folded state, the second elastic member 500 is extended to accumulate the elastic force.

It is to be noted that the second elastic member 500 may be provided in the central pipe 100 and may also surround the central pipe 100. As shown in FIG. 18, the second elastic member 500 is a spring sleeved on the central pipe 100. It is to be understood that the second elastic member 500 may also be a spring piece or an elastic pad on the central pipe 100. In addition, there may be one second elastic member 500 or a plurality of second elastic members spaced circumferentially.

In an embodiment, the sliding seat 210 is cylindrical with an inner diameter slightly greater than the outer diameter of the central pipe 100 and is sleeved outside the central pipe 100. In other embodiments, the sliding seat 210 may also be provided with a slider extended into the central pipe 100. A track is provided on the central pipe 100. The sliding seat 210 moves along the track through the slider. To draw the photography stand conveniently, traction member 910 is further provided on the photography stand 10. The traction member 910 is connected to the sliding seat 210. The traction member 910 can drive the sliding seat 210 to slide along the axial direction of the central pipe 100. In an embodiment, the traction member 910 is a tubular structure. The traction member 910 is sleeved on the central pipe 100 and encloses an accommodating space 920 with the central pipe 100. The second elastic member 500 is located in the accommodating space 920 and can accumulate or release the elastic force under the driving of the traction member 910. It is to be understood that the traction member 910 may also be other easy-to-use structures such as a handle in other embodiments. It is to be noted that for the embodiment in which the photography stand 10 further includes the bushing 300, the traction member 910 may be at least partially accommodated in the bushing 300 and can slide in the bushing 300.

The locking assembly 400 can keep the relative fixation between the sliding seat 210 and the central pipe 100 in the folded state and allow the second elastic member 500 to be fixed and accumulate the elastic force. When the photography stand is unfolded, the locking assembly 400 can unlock the relative fixation between the sliding seat 210 and the central pipe 100, such that the sliding seat 210 can slide under an elastic force released by the second elastic member 500 and drive the supporting legs 220 to unfold. For the first embodiment, the supporting legs 220 are unfolded at the bottom of the central pipe 100.

The locking assembly 400 includes first locking member 440 and second locking member 450. The first locking member 440 is provided on the central pipe 100, and the second locking member 450 is provided on the supporting frame 200. In response to the folded state, the first locking member 440 is extended out of the central pipe 100 such that the supporting frame 200 is fixed relative to the central pipe 100. In an embodiment, one end of the traction member 910 is connected to the sliding seat 210 and forms clamping portion 211. The first locking member 440 is extended out of the central pipe 100 and extended into the clamping portion 211, such that the supporting frame 200 is fixed relative to the central pipe 100. The second locking member 450 is movably provided at the clamping portion 211. The second locking member 450 can be pressed to drive the first locking member 440 to retract into the central pipe 100. The first locking member 440 is separated from the clamping portion 211. The second elastic member 500 releases the elastic force and can drive the supporting legs 220 to unfold.

As shown in FIG. 18, the clamping portion is step 213 between the sliding seat 210 and the traction member 910. The second locking member 450 is button 321 movably provided at the clamping portion. The first locking member 440 abuts the button 321 while extending into the clamping portion. Since the step 213 interferes with the first locking member 440 to obstruct the sliding seat 210, the supporting frame 200 is fixed relative to the central pipe 100. When the photography stand 10 is unfolded, the button 321 is pressed, such that the button 321 drives the first locking member 440 to retract. In this case, the first locking member 440 is separated from the clamping portion 211. The second elastic member 500 releases the elastic force, thereby driving the sliding seat 210 to slide relative to the central pipe 100 and driving the supporting legs 220 to unfold. With the second locking member 450, the first locking member 440 is retracted into the central pipe 100. In other embodiments, the second locking member 450 may also be a pull ring for pulling the first locking member 440 in a reverse direction. The clamping portion may also be other structures capable of fixing the first locking member 440, such as a clamping groove.

To sum up, the photography stand 10 provided by the embodiment of the present disclosure can be configured to mount the photographic equipment. The photographic equipment may be, but is not limited to, a camera or a mobile phone. By manipulating the photography stand 10 with a hand, the photography stand 10 can be folded and unfolded. In response to the folded state of the photography stand 10, the photography stand 10 can be held by a single hand and stored conveniently. In response to the unfolded state of the photography stand 10, the photography stand 10 can support the photographic equipment on a flat or rugged table or ground.

Figure 19:
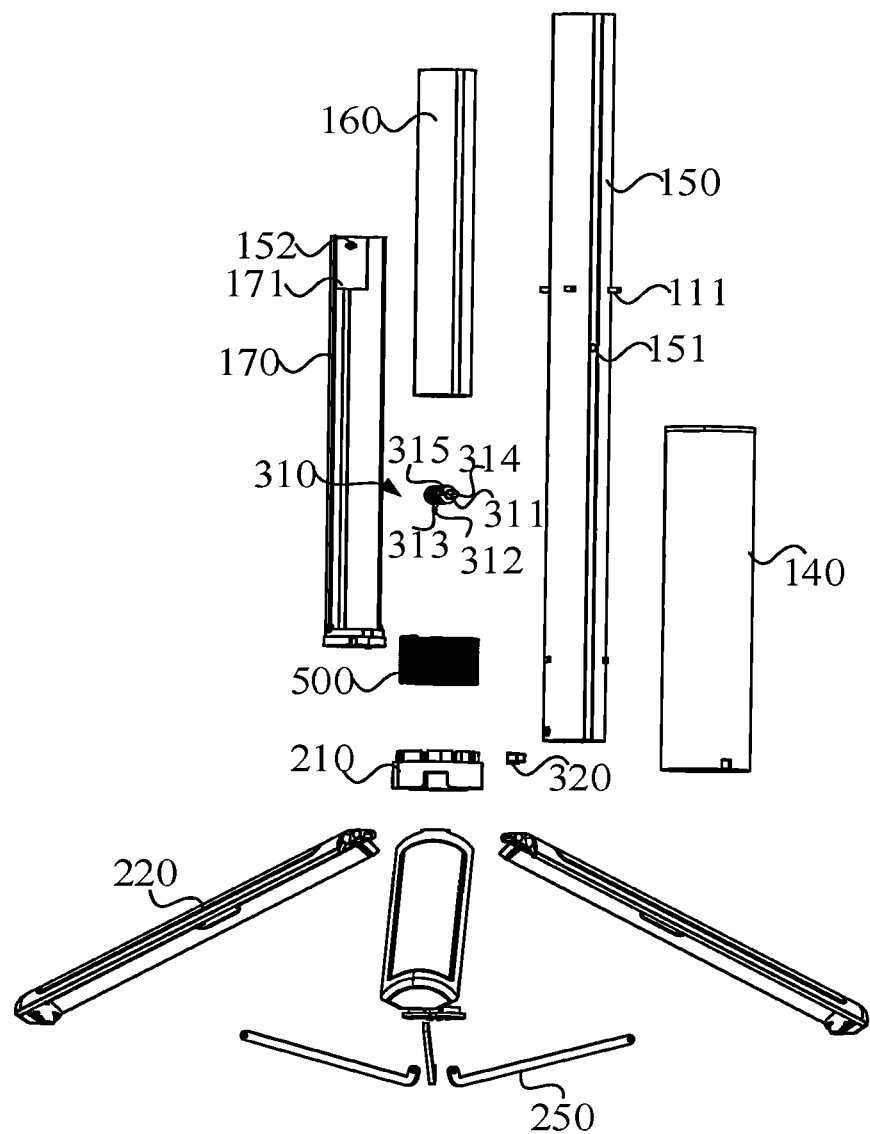
FIG. 19 is a schematic exploded view of the photography stand of FIG. 17.

Referring to FIG. 18 and FIG. 19, the first locking member 440 includes central member 311 and fourth elastic member 312. The central member 311 is extended out of the central pipe 100 under the elastic force of the fourth elastic member 312. When the central member 311 is pressed to retract into the central pipe 100, the fourth elastic member 312 accumulates the elastic force. Upon removal of the pressing action, the central member 311 can be extended out of the central pipe 100 again under the elastic force of the fourth elastic member 312. At least one of the traction member 910 and an extending end 313 of the central member 311 is provided with an oblique surface 314. When the sliding seat 210 moves along the axial direction of the central pipe 100 from the second end 140 to the first end 130, the traction member 910 interferes with the extending end 313 of the central member 311, and the central member 311 is squeezed through the oblique surface 314 to retract into the central pipe 100. When the central member 311 is aligned with the clamping portion 211, the central member 311 under the elastic force of the fourth elastic member 312 can be extended out of the central pipe 100 and clamped at the clamping portion 211. As shown in FIG. 18, the oblique surface 314 is provided at the extending end 313 of the central member 311. In other embodiments, the oblique surface 314 may also be provided on the traction member 910, or both the traction member 910 and the extending end of the central member 311 are provided with the oblique surface 314.

In an embodiment, the first locking member 440 is provided in the central pipe 100. First through hole 151 and second through hole 152 are formed in the central pipe 100. The first through hole 151 allows the extending end 313 of the central member 311 to pass through, and the second through hole 152 allows an end of the central member 311 away from the extending end 313 to pass through. When the extending end 313 of the central member 311 is extended out of or retracted into the first through hole 151, the other end of the central member is extended or retracted in the second through hole 152. The second through hole 152 provides a space where the central member 311 is extended or retracted in the central pipe 100. In other embodiments, the second through hole 152 may be only provided as a groove not penetrating through the central pipe 100. A side of the central member 311 located in the central pipe 100 and adjacent to the first through hole 151 is provided with boss 315. The fourth elastic member 312 includes one end abutting the boss 315 and the other end abutting the periphery of the second through hole 152 in the central pipe 100. When the central member 311 is squeezed and retracted, the fourth elastic member 312 is compressed through the boss 315 and accumulates the elastic force, and the central member 311 can be extended out of the central pipe 100 again through the boss 315 under the elastic force of the fourth elastic member 312. In other embodiments, the fourth elastic member 312 may also be drawn to accumulate the elastic force. In this case, two ends of the fourth elastic member 312 are respectively and fixedly connected to the boss 315 and a periphery of the first through hole 151. The fourth elastic member 312 may surround the central member 311 and may also be provided in the central member 311. As shown in FIG. 18, the fourth elastic member 312 is a spring sleeved on the central pipe 311. It is to be understood that the fourth elastic member 312 may also be a spring piece or an elastic pad on the central pipe 311. In addition, there may be one fourth elastic member 312 or a plurality of fourth elastic members spaced circumferentially.

Referring also to FIG. 19, the central pipe 100 is further provided with arc-shaped strip 170. The arc-shaped strip 170 is located in the central pipe 100 and takes up a part of the length of the central pipe 100. The second through hole 152 is formed in the arc-shaped strip 170. The first locking member 440 can be provided in the central pipe 100 through the arc-shaped strip 170. The arc-shaped strip 170 is provided with the first locking member 440 therein and further provided in the central pipe 100. Without the arc-shaped strip 170, the first locking member 440 is directly provided in the central pipe 100 and causes many inconveniences. By providing the arc-shaped strip 170, the material and cost required for machining are further saved. In an embodiment, thickening region 171 is provided on the arc-shaped strip 170. The second through hole 152 is formed in the thickening region 171, such that the central member 311 has a larger moving space in the second through hole 152. In other embodiments, the arc-shaped strip 170 may also be a tubular structure, and the first locking member 440 is provided at an end of the tubular structure, which can also ensure that the central pipe 100 is provided conveniently. In this case, both the second through hole 152 and the first through hole 151 are formed in the arc-shaped strip 170.

In an embodiment, the supporting frame 200 further includes connecting rods 250. The connecting rods 250 are the same as the supporting legs 220 quantitatively. Two ends of the connecting rods 250 are respectively and rotatably connected to the central pipe 100 and the supporting legs 220. Since one end of each of the supporting legs 220 is connected to the sliding seat 210, when the sliding seat 210 and the central pipe 100 move relative to each other, the connecting rods 250 can drive all supporting legs 220 to unfold or collapse synchronously. In other embodiments, traction ropes and the like may be provided on the supporting legs 220, such that the supporting legs 220 are unfolded or folded synchronously. The supporting legs 220 are arcuate strip-shaped and are folded into a cylindrical body. When the supporting legs 220 are folded, the central pipe 100 and the connecting rods 250 are closed up inside the supporting legs 220, such that the photography stand 10 is stored more aesthetically and carried more conveniently. In other embodiments, the supporting legs 220 may also be provided as any shape.

Fifth Embodiment

The photography stand 10 of the embodiment is structurally similar to that of the first embodiment, except that the structure of the locking assembly 400 in the embodiment differs from that of the locking assembly 400 in the first embodiment. In the embodiment, the locking assembly 400 includes first locking member 440 and second locking member 450. For specific structures of the first locking member 440 and the second locking member, refer to relevant descriptions on the photography stand 10 in the fourth embodiment so the descriptions are not repeated herein.

The foregoing are merely preferred embodiments of the present disclosure, and the scope of the present disclosure is not limited thereto. Any equivalent structure change made using the content of the specification of the present disclosure and the accompanying drawings under the inventive concept of the present disclosure or direct/indirect application thereof in other related technical fields shall fall within the protection scope of the present disclosure.

What is claimed is:

1. A photography stand, comprising:
a central pipe, wherein a top of the central pipe is configured to mount photographic equipment;
a supporting frame connected to the central pipe and provided adjacent to a bottom of the central pipe, wherein the supporting frame moves relative to the central pipe along an axial direction of the central pipe, the supporting frame is unfolded when moving along the axial direction of the central pipe toward the bottom of the central pipe by a preset distance and then moving continuously toward the bottom of the central pipe, and the supporting frame is folded when moving along the axial direction of the central pipe toward the top of the central pipe, and wherein the supporting frame comprises a sliding seat and a plurality of supporting legs; the sliding seat is slidably sleeved on a periphery of the central pipe; an end of each supporting leg of the plurality of supporting legs is rotatably connected to the sliding seat; the plurality of supporting legs are arranged alternately on a periphery of the sliding seat; when each supporting leg moves with the sliding seat along the axial direction of the central pipe toward the bottom of the central pipe by the preset distance and then moves continuously toward the bottom of the central pipe, each supporting leg rotates away from the central pipe and is unfolded; and when each supporting leg moves with the sliding seat along the axial direction of the central pipe toward the top of the central pipe, each supporting leg rotates toward the central pipe and is folded; and
a bushing, wherein the bushing is sleeved on the periphery of the central pipe; the sliding seat drives the plurality of supporting legs to extend out of the bushing through a bottom opening of the bushing and to unfold; and the plurality of supporting legs in a folded state are retracted and stored in the bushing through the bottom opening of the bushing;
wherein a plurality of first openings are formed at a bottom of the bushing; the plurality of first openings are in one-to-one correspondence with the plurality of supporting legs quantitatively; the plurality of first openings are arranged alternately along a circumference of the bushing; and the plurality of supporting legs penetrate through the plurality of first openings, such that the plurality of supporting legs are unfolded on a periphery of the bushing.

2. The photography stand according to claim 1, wherein the supporting frame further comprises a plurality of first rotating shafts and a plurality of first elastic members; the end of each supporting leg is rotatably connected to the sliding seat through each first rotating shaft of the plurality of first rotating shafts; each supporting leg rotates relative to the sliding seat around an axial direction of each first rotating shaft; and the plurality of first rotating shafts are in one-to-one correspondence with the plurality of supporting legs; and each first elastic member of the plurality of first elastic members is configured to provide an elastic force for each supporting leg to drive each supporting leg to automatically unfold at the bottom of the central pipe; and the plurality of first elastic members are in one-to-one correspondence with the plurality of supporting legs.

3. The photography stand according to claim 2, further comprising a second elastic member, wherein the second elastic member is provided in the bushing; and the second elastic member is configured to drive the supporting frame to move along the axial direction of the central pipe toward the bottom of the central pipe and to unfold automatically.

4. The photography stand according to claim 3, wherein the supporting frame further comprises cams connected and fixed with ends of the plurality of supporting legs; in response to the folded state of the supporting frame, the cams are protrusively provided on the sliding seat; the photography stand further comprises a drive slider; the drive slider is provided on the central pipe and moves along the axial direction of the central pipe; the drive slider is adjacent to a top of the bushing and is connected to the bushing through the second elastic member; the second elastic member releases an elastic force, such that the drive slider drives the sliding seat to move along the axial direction of the central pipe; and when the drive slider drives the sliding seat to move to a bottom of the bushing, the drive slider applies an external force to the cams, such that the cams drive the plurality of supporting legs to rotate and unfold at the bottom of the bushing.

5. The photography stand according to claim 1, wherein a plurality of second openings are formed at the bottom of the central pipe; the plurality of second openings are in one-to-one correspondence with the plurality of first openings quantitatively; the plurality of second openings are arranged alternately along a circumference of the central pipe; and the plurality of supporting legs penetrate through the plurality of second openings, such that the plurality of supporting legs are unfolded on the periphery of the bushing.

6. The photography stand according to claim 3, further comprising a locking assembly, wherein the locking assembly has a locked state and an unlocked state; in response to the locked state of the locking assembly, the locking assembly locks the supporting frame in the folded state to be in the bushing; and in response to the unlocked state of the locking assembly, the locking assembly unlocks the supporting frame in the folded state relative to the bushing.

7. The photography stand according to claim 6, wherein a through hole is formed in a sidewall of the bushing; the locking assembly comprises a latch; the latch comprises a main body portion and a latching portion connected to the main body portion; and the main body portion is rotatably provided on the bushing, such that the latch is switched between a locked state and an unlocked state;

in response to the locked state of the latch, the latching portion is extended into the bushing through the through hole and clamped to the supporting frame to prevent the supporting frame from moving relative to the central pipe and the bushing along the axial direction of the central pipe, and to lock the supporting frame in the folded state to be in the bushing; and in response to the unlocked state of the latch, the latching portion is extended out of the bushing through the through hole and separated from the supporting frame to unlock the supporting frame in the folded state.

8. The photography stand according to claim 7, wherein the locking assembly further comprises a second rotating shaft; the main body portion is rotatably provided on the bushing through the second rotating shaft; and the main body portion rotates relative to the bushing around an axial direction of the second rotating shaft.

9. The photography stand according to claim 7, wherein the locking assembly further comprises a third elastic member; and the third elastic member is configured to provide an elastic force for the main body portion, such that the main body portion drives the latching portion to rotate toward the through hole, and the latching portion is extended into the bushing through the through hole and clamped to the supporting frame.

10. The photography stand according to claim 2, further comprising a second elastic member and a locking assembly, wherein the second elastic member is connected to the sliding seat; the locking assembly comprises a first locking member and a second locking member; the first locking member is provided on the central pipe, and the second locking member is provided on the supporting frame; in response to a folded state of the supporting frame, the first locking member is extended out of the central pipe to fix relative to the central pipe and allow the second elastic member to accumulate an elastic force; and the second locking member drives the first locking member to retract into the central pipe, such that the second elastic member releases the elastic force to drive the plurality of supporting legs to move toward the bottom of the central pipe.

11. The photography stand according to claim 10, further comprising a traction member, wherein one end of the traction member is connected to the sliding seat and forms a clamping portion; the second locking member is movably provided at the clamping portion; and the traction member drives the sliding seat to slide along the axial direction of the central pipe, such that the first locking member is automatically extended into the clamping portion when aligning with the clamping portion.

12. The photography stand according to claim 11, wherein the traction member is a tubular structure; the traction member is sleeved on the central pipe and encloses an accommodating space with the central pipe; and the second elastic member is located in the accommodating space, and accumulates or releases the elastic force under driving of the traction member.

13. The photography stand according to claim 11, wherein the first locking member comprises a central member, a third elastic member configured to provide an elastic force for the main body portion, and a fourth elastic member; when the first locking member is aligned with the clamping portion, the central member under an elastic force of the fourth elastic member is extended out of the central pipe and clamped at the clamping portion; and the second locking member is pressed to drive the central member to retract into the central pipe, the central member is separated from the clamping portion, and the second elastic member releases the elastic force to drive the plurality of supporting legs to move and unfold.

14. The photography stand according to claim 13, wherein at least one of the traction member and an extending end of the central member is provided with an oblique surface; when the sliding seat moves along the axial direction of the central pipe, the traction member interferes with the extending end of the central member, and the central member is squeezed through the oblique surface to retract into the central pipe; and when the central member is aligned with the clamping portion, the central member under the elastic force of the fourth elastic member is extended out of the central pipe and clamped at the clamping portion.

15. The photography stand according to claim 13, wherein a first through hole and a second through hole are formed in the central pipe; the first through hole allows the extending end of the central member to pass through, and the second through hole allows an end of the central member to pass through, wherein the end of the central member is away from the extending end; a side of the central member is located in the central pipe and adjacent to the first through hole, and the side of the central member is provided with a boss; the fourth elastic member comprises a first end abutting the boss and a second end abutting a periphery of the second through hole in the central pipe; and when the extending end of the central member is squeezed and retracted, the fourth elastic member accumulates the elastic force, and the extending end of the central member is extended out of the central pipe again under the elastic force of the fourth elastic member.

16. A photography stand, comprising:
a central pipe, wherein a top of the central pipe is configured to mount photographic equipment;
a supporting frame connected to the central pipe and provided adjacent to a bottom of the central pipe, wherein the supporting frame moves relative to the central pipe along an axial direction of the central pipe, the supporting frame is unfolded when moving along the axial direction of the central pipe toward the bottom of the central pipe by a preset distance and then moving continuously toward the bottom of the central pipe, and the supporting frame is folded when moving along the axial direction of the central pipe toward the top of the central pipe, and wherein the supporting frame comprises a sliding seat and a plurality of supporting legs: the sliding seat is slidably sleeved on a periphery of the central pipe; an end of each supporting leg of the plurality of supporting legs is rotatably connected to the sliding seat; the plurality of supporting legs are arranged alternately on a periphery of the sliding seat when each supporting leg moves with the sliding seat along the axial direction of the central pipe toward the bottom of the central pipe by the preset distance and then moves continuously toward the bottom of the central pipe, each supporting leg rotates away from the central pipe and is unfolded and when each supporting leg moves with the sliding seat along the axial direction of the central pipe toward the top of the central pipe, each supporting leg rotates toward the central pipe and is folded;
a bushing, wherein the bushing is sleeved on the periphery of the central pipe; the sliding seat drives the plurality of supporting legs to extend out of the bushing through a bottom opening of the bushing and to unfold; and the plurality of supporting legs in a folded state are retracted and stored in the bushing through the bottom opening of the bushing; and
wherein
the supporting frame further comprises a plurality of first rotating shafts, a plurality of first elastic members, and gears connected and fixed with ends of the plurality of supporting legs: the end of each supporting leg is rotatably connected to the sliding seat through each first rotating shaft of the plurality of first rotating shafts: each supporting leg rotates relative to the sliding seat around an axial direction of each first rotating shaft; and the plurality of first rotating shafts are in one-to-one correspondence with the plurality of supporting legs;
each first elastic member of the plurality of first elastic members is configured to provide an elastic force for each supporting leg to drive each supporting leg to automatically unfold at the bottom of the central pipe; and the plurality of first elastic members are in one-to-one correspondence with the plurality of supporting legs;
a second elastic member is provided in the bushing: and the second elastic member is configured to drive the supporting frame to move along the axial direction of the central pipe toward the bottom of the central pipe and to unfold automatically; and
a drive slider, wherein the drive slider is provided on the central pipe and moves along the axial direction of the central pipe; the drive slider is adjacent to a top of the bushing and is connected to the bushing through the second elastic member; the drive slider comprises racks; and the second elastic member releases an elastic force, such that the drive slider drives the sliding seat to move along the axial direction of the central pipe toward the bottom of the central pipe; and
the gears and the racks are in one-to-one correspondence with the plurality of supporting legs quantitatively; and when the drive slider drives the sliding seat to move to a bottom of the bushing, the racks drive the gears to rotate, such that the supporting frame is unfolded.

17. A photography stand, comprising:
a central pipe provided with a first end and a second end, wherein the first end and the second end are arranged along an axial direction of the central pipe;
a supporting frame comprising a sliding seat, a plurality of supporting legs, and a second elastic member, wherein the plurality of supporting legs are rotatably connected to the sliding seat; the second elastic member is connected to the sliding seat; and the sliding seat moves between the first end and the second end along the axial direction of the central pipe, such that the plurality of supporting legs are in a folded state at the first end, and in an unfolded state at the second end; and
a locking assembly comprising a first locking member and a second locking member, wherein the first locking member is provided on the central pipe, and the second locking member is provided on the supporting frame; in response to the folded state, the first locking member is extended out of the central pipe, such that the supporting frame is fixed relative to the central pipe, and the second elastic member accumulates an elastic force; and the second locking member drives the first locking member to retract into the central pipe, such that the second elastic member releases the elastic force to unfold the plurality of supporting legs.

* * * * *